US008028671B1

(12) United States Patent
Grozich

(10) Patent No.: US 8,028,671 B1
(45) Date of Patent: Oct. 4, 2011

(54) SERPENTINE BELT SYSTEM

(75) Inventor: Glenn Grozich, Hinsdale, IL (US)

(73) Assignee: Billet Specialties, Inc., La Grange, IL (US)

( * ) Notice: Subject to any disclaimer, the term of this patent is extended or adjusted under 35 U.S.C. 154(b) by 0 days.

(21) Appl. No.: 12/782,138

(22) Filed: May 18, 2010

Related U.S. Application Data

(63) Continuation of application No. 11/348,592, filed on Feb. 7, 2006, now Pat. No. 7,717,080.

(60) Provisional application No. 60/691,368, filed on Jun. 17, 2005, provisional application No. 60/650,922, filed on Feb. 8, 2005.

(51) Int. Cl.
*F02B 67/00* (2006.01)
*F16M 1/00* (2006.01)
(52) U.S. Cl. ........... 123/195 A; 123/198 R; 248/220.21; 248/220.22
(58) Field of Classification Search .............. 123/195 R, 123/195 A, 198 R, 198 C, 41.44; 29/525.13; 220/200, 220.21, 220.22
See application file for complete search history.

(56) References Cited

U.S. PATENT DOCUMENTS

| | | |
|---|---|---|
| 3,730,147 A | 5/1973 | Buchwald |
| 5,065,713 A | 11/1991 | Seats |
| 5,125,376 A | 6/1992 | Williams et al. |
| 5,203,293 A | 4/1993 | Shintani et al. |
| 5,692,466 A | 12/1997 | Hausmann et al. |
| 5,743,229 A | 4/1998 | Hosoya |
| 6,101,995 A | 8/2000 | Itoh et al. |
| 6,244,239 B1 | 6/2001 | Sisco et al. |
| 6,324,744 B1 | 12/2001 | Banks et al. |
| 6,371,072 B1 | 4/2002 | Huber |
| 6,588,524 B2 | 7/2003 | Keen et al. |
| 7,011,068 B2 | 3/2006 | Yamagata et al. |
| 7,044,100 B2 | 5/2006 | Stone |
| 7,086,369 B2 | 8/2006 | Stone |
| 7,717,080 B1 | 5/2010 | Grozich |
| 2005/0051686 A1 | 3/2005 | Payne |
| 2006/0091751 A1 | 5/2006 | Gaul |

FOREIGN PATENT DOCUMENTS

JP 2001193473 A * 7/2001

* cited by examiner

*Primary Examiner* — Noah Kamen
(74) *Attorney, Agent, or Firm* — Neal, Gerber & Eisenberg LLP

(57) ABSTRACT

A serpentine belt system for use in connection with an engine block for an automotive engine is disclosed. A spacer, which is preferably a pair of brackets, is provided for mounting on the face of the engine block. A bridge bracket is secured to the spacer brackets, and other elements of the automotive system, such as the air conditioner compressor and alternator, may be secured to the bridge bracket. The system may further include a tensioner having a tensioner housing mounted on and supported by the air conditioner compressor, and a tensioner pulley is mounted to the tensioner housing for adjusting the serpentine belt system.

22 Claims, 35 Drawing Sheets

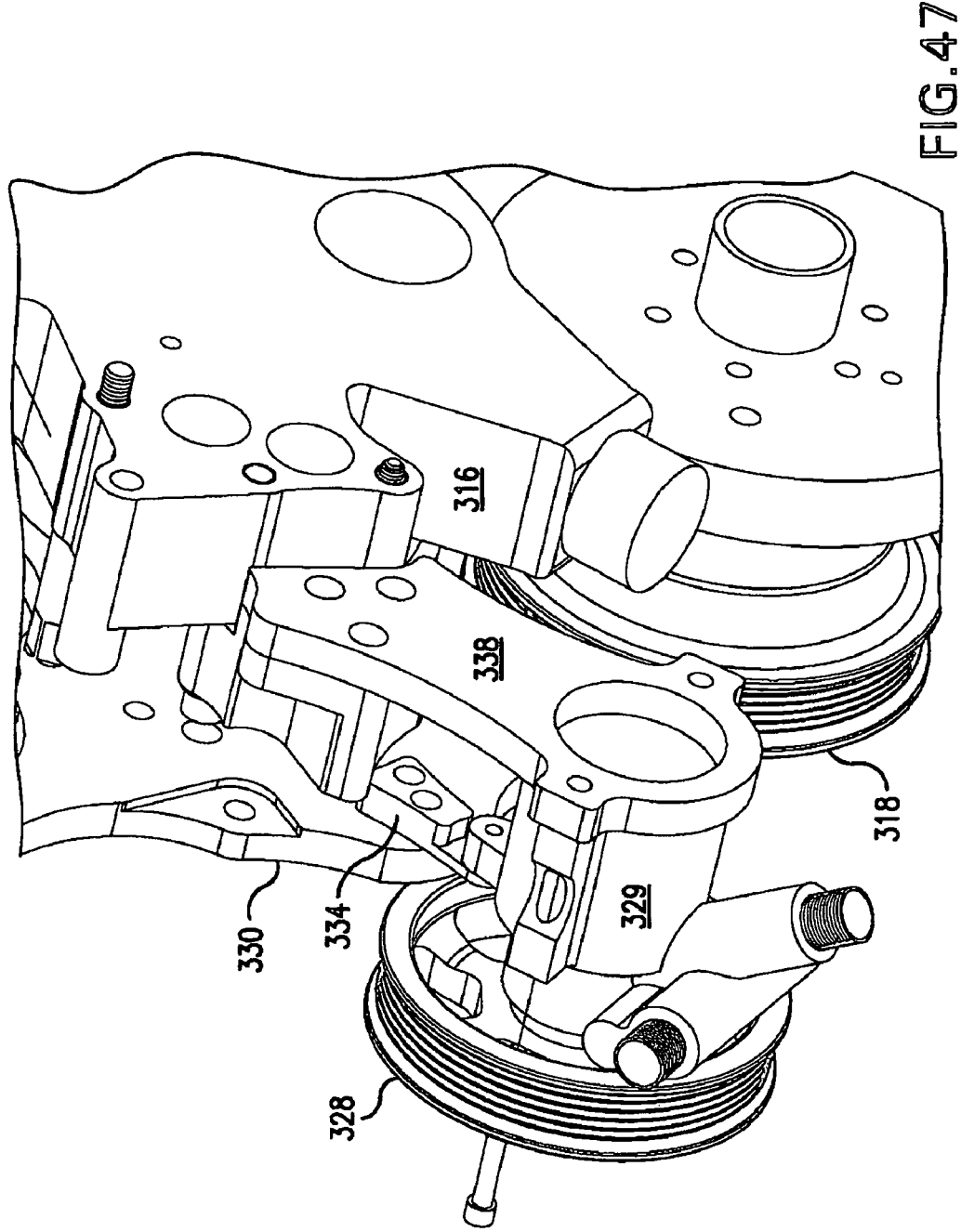
FIG. 4.7

SERPENTINE BELT SYSTEM

RELATED APPLICATIONS

This application is a continuation of U.S. patent application Ser. No. 11/348,592, filed Feb. 7, 2006, which claims priority from U.S. Provisional Application Ser. No. 60/650,922, filed Feb. 8, 2005 and U.S. Provisional Application Ser. No. 60/691,368, filed Jun. 17, 2005. The terms of these prior applications are incorporated herein by reference in their entirety.

BACKGROUND OF THE INVENTION

This invention relates to serpentine belt systems for use with an automotive engine and its associated compressors, pumps and other elements of an automotive drive system.

SUMMARY OF THE INVENTION

The inventions disclosed herein provide an improved serpentine belt system that provides many advantages over currently available aftermarket systems. This design provides a universal kit that may be used with a wide variety of engines. It is disclosed herein in connection with multiple embodiments, including small block and big block Chevrolet engines, Ford engines and Chrysler engines for aftermarket modification. The inventions could also be used with other engine designs with minor modifications generally dictated by the specific dimensions or features of the engine design.

One advantage of these designs is that the overall envelope of the serpentine belt system is more compact than in prior designs, and it fits generally within the envelope of the engine block.

A further benefit of these designs is that, for all engine block designs, a serpentine system in accordance with the present invention does not mount in any manner to the cylinder head. Prior art designs require mountings to the cylinder heads, and since cylinder head designs change over time (even within models) this prevents the prior art designs from being universal.

One embodiment of the invention, when used in connection with a big block or small block Chevrolet engine, provides an o-ring sealed bracket set acting as a spacer mounted between the water pump and the engine block. The rest of the structure mounts off the bracket set, moving the various components forward from the engine block, providing space to mount elements such as the air conditioner compressor, alternator and power steering pump within the envelope of the engine block. This means that when the entire assembled kit and engine block is viewed from the front, the accessories or pulleys to which the serpentine belt is attached will generally not extend beyond the sides of the engine block. This provides for a more compact design that takes up less space in the engine compartment, and it is more aesthetically pleasing.

The kit as taught herein is adaptable to be used with or without an air conditioning compressor and with or without a power steering unit, depending on the installer's preferences. While it is preferably shown with a pair of brackets mounted to the engine block, it will be understood that a single bracket could be used in accordance with this invention.

An improved tensioner for use with the belt system is also disclosed. This tensioner design provides a unique attachment configuration to permit it to be attached to either the brackets or the other components, rather than directly to the engine block. The tensioner disclosed herein also provides a unique double bearing arrangement to provide bearing support in multiple directions, increasing the longevity of the unit.

The depicted embodiment used in connection with Ford engines provides a timing cover that is used to replace the stock timing chain cover, and to mount the other components thereon in connection with a bridge bracket.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

FIG. 47 is a rear perspective view of certain components of the assembly shown in FIG. 34, and in particular showing the attachment of the power steering unit and its related brackets.

DETAILED DESCRIPTION OF THE DRAWINGS

Figure 1:
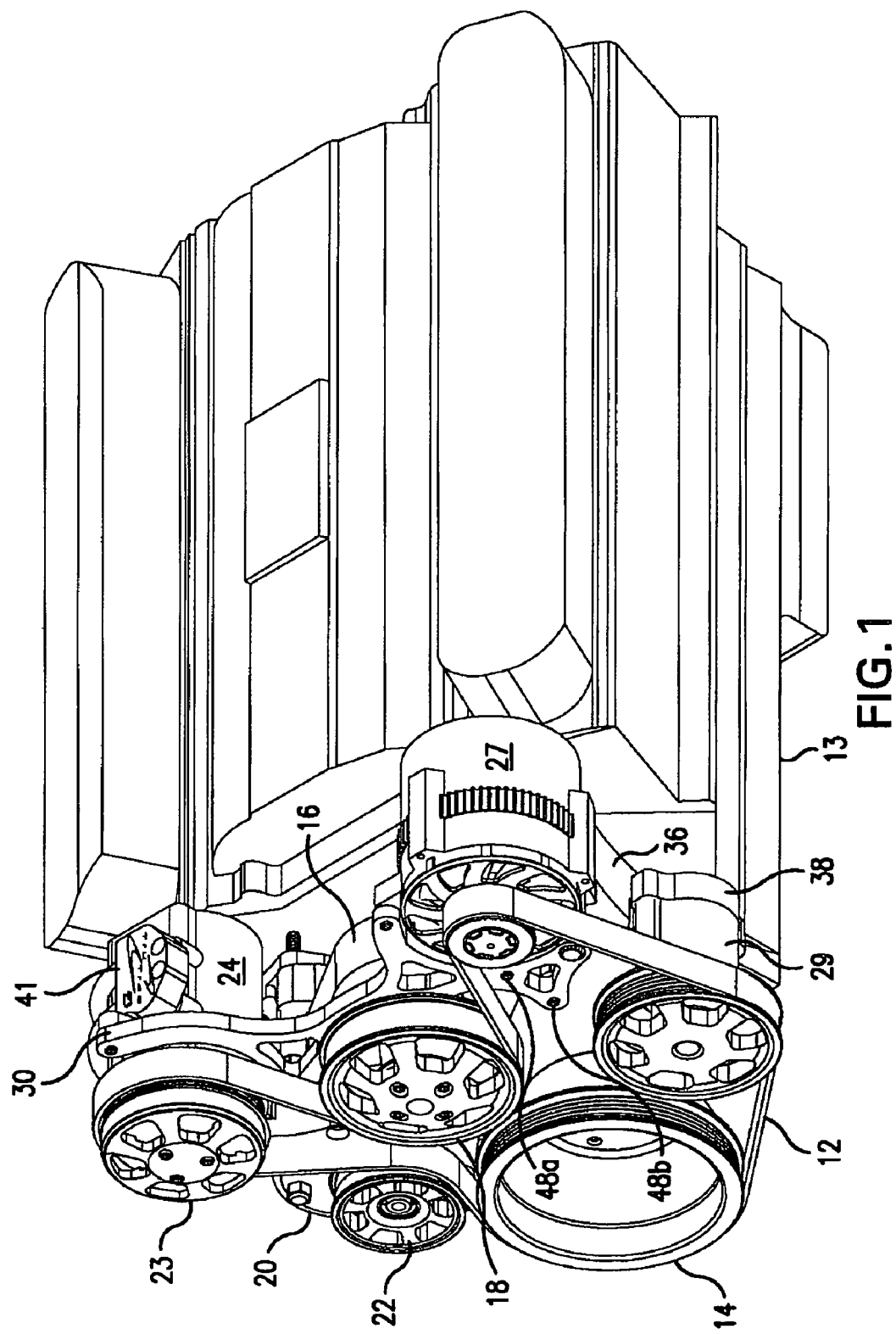
FIG. 1 is a front perspective view of an embodiment of a serpentine belt system and associated pumps, compressors, pulleys and related parts, shown in connection with small block Chevrolet engine.
Figure 2:
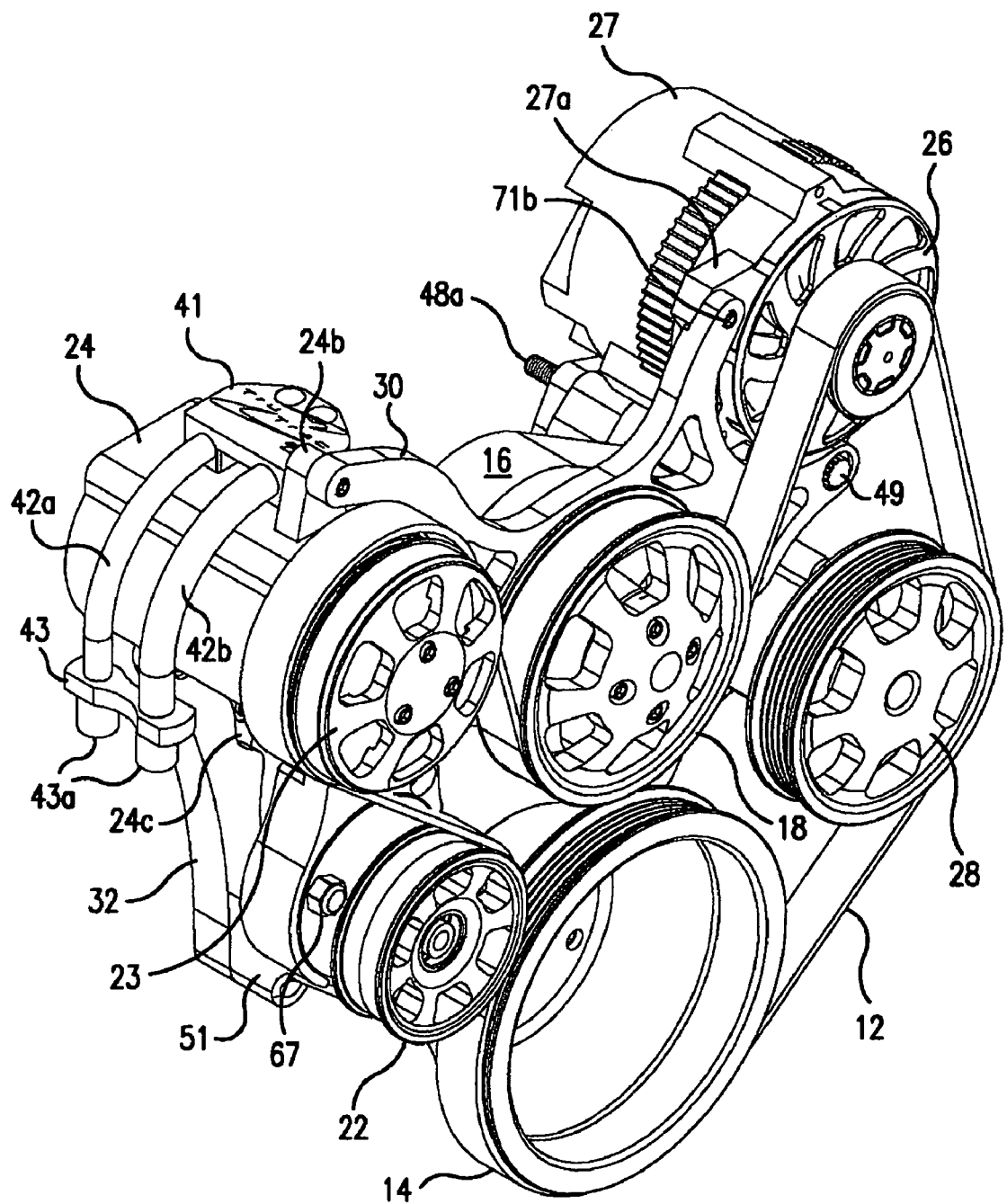
FIG. 2 is a front perspective view of the serpentine belt system shown in FIG. 1, without the engine block, shown from the opposite side.

FIGS. 1-5 show an arrangement of serpentine belt system 10 for use in a small block engine, such as a 350 cubic inch small block Chevrolet engine or engines having similar engine block characteristics and/or dimensions, and FIGS. 6-18 depict various components of system 10. FIGS. 19-22 depict a similar application for a big block engine, such as a 454 cubic inch Chevrolet engine or engines having similar engine block characteristics and/or dimensions. FIGS. 23-33 depict an alternative embodiment for use with Ford engines or engines having similar engine block characteristics and/or dimensions. FIGS. 34-47 depict another alternative embodiment for use with Chrysler engines, and, in particular, the Chrysler Hemi engine or engines having similar engine block characteristics and/or dimensions. The invention disclosed herein is not to be read as being limited to these embodiments, as it can be used in other engine applications, including engines from other original equipment manufacturers.

In the first embodiment shown in FIGS. 1-5, crankshaft pulley 14 is engaged to and driven by a crankshaft (not shown) located in engine block 13, as is known in the art. The details of engine block 13 are not critical and are not shown in these figures. Belt 12 is engaged to and driven by crankshaft pulley 14 and also engages tensioner pulley 22, air conditioner pulley 23, water pump pulley 18, alternator pulley 26, and power steering pulley 28. The attachment of tensioner 20, air conditioning compressor 24, water pump 16, alternator 27 and power steering unit 29 to the overall assembly is discussed below.

This design can be used with standard engine components. For example, in the embodiment depicted in FIGS. 1-5, alternator 27, air conditioning compressor 24 and power steering pump 29 are all intended to be standard, known designs. Water pump 16 is a reverse rotation water pump, to permit the pulley arrangement such as is shown in FIG. 1, where water pump pulley 18 is rotating in the opposite direction of crankshaft pulley 14. In the embodiment shown, water pump 16 is a standard water pump for use in a small block Chevrolet engine, such as an Edelbrock water pump. Tensioner 20 is of a new design as will be described in more detail below.

It will be understood that many of the studs, bolts or other fasteners used to connect the various components are not depicted in the figures, and in most instances those that are depicted are not described in detail herein, simply for clarity. One of skill in the art will understand the different manners in which components of this nature may be connected.

Figure 6:
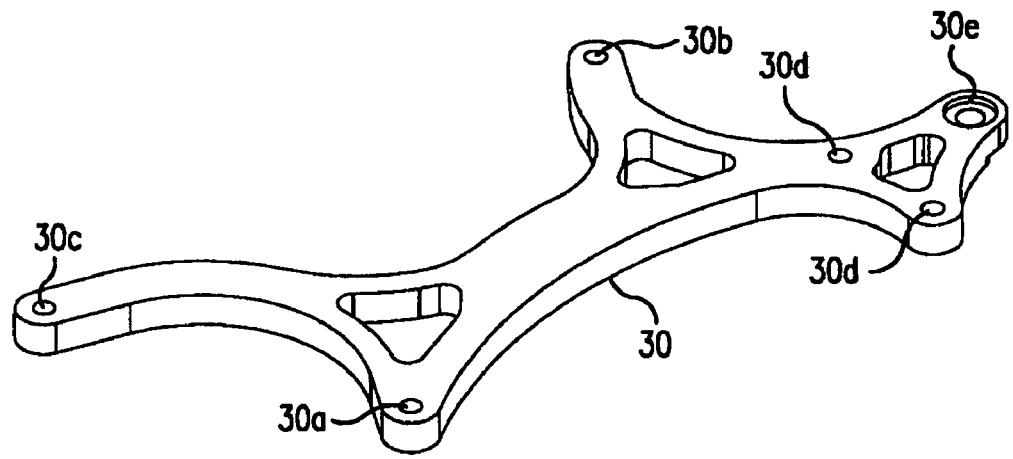
FIG. 6 is a perspective view of the bridge bracket for use in the system shown in FIG. 2.

In a depicted embodiment, a series of mounting brackets is used to connect the various system components together and to engine block 13, thus avoiding the need to secure any of the components to the water pump or cylinder heads. As will be described in more detail below, bridge bracket 30, which is shown in detail in FIG. 6, is used to connect the various components. These different brackets and the other components are discussed below.

The system of brackets and connectors described below provides a belt assembly 10 that is extremely compact in size and fits within the envelope of engine block 13; i.e., the majority of the components of belt system 10 do not extend outside the sides of engine block 13. For the installation of aftermarket components, this small size increases the applicability of the design and simplifies installation. System 10 also is very compact in depth of the unit extending from the front of engine block 13. By way of example, in an embodiment, the distance from the front face of engine block 13 to the front of alternator pulley 26 is approximately 6.5 inches, to the front of water pump pulley 18 is approximately 7.0 inches, and to the front of air conditioner pulley 23 is approximately 7.44 inches.

Figure 7:
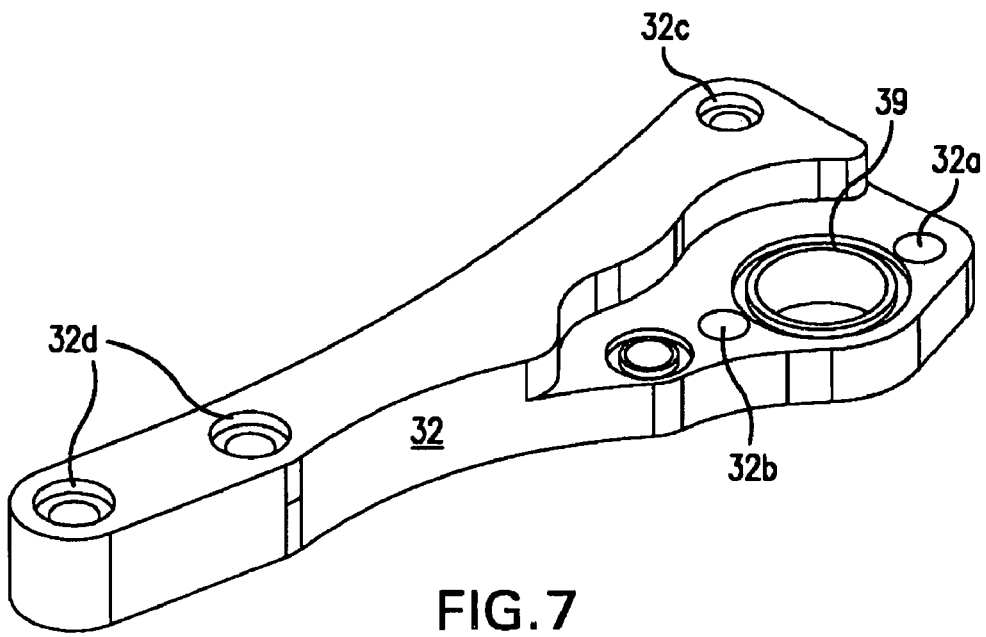
FIG. 7 is a perspective view of the air conditioning pump bracket for use in the system shown in FIG. 2.

Air conditioner compressor bracket 32, shown in detail in FIG. 7, may be provided to securely connect air conditioner compressor 24 to the overall assembly 10. Specifically, air conditioner compressor 24 may be connected to both compressor bracket 32 and bridge bracket 30. In the depicted embodiment, air conditioner compressor 24 is shown connected to compressor bracket 32 by a fastener (not shown), extending through fastener opening 32c and into boss 24a, formed on compressor 24. Compressor 24 is also secured to bridge bracket 30 by fastener 71a, which extends through fastener opening 30c and into boss 24b which is formed on compressor 24. This arrangement gives the unit the necessary rigidity with a minimum of connection points and a small overall size. Air conditioner clutch cover 23 is mounted on the face of air conditioner compressor 24 by known means; pulley 23 may be integrally formed with compressor 24 in a standard design. Tensioner housing 52 is attached to a third boss 24c formed on the front of compressor 24 as will be discussed below.

Figure 3:
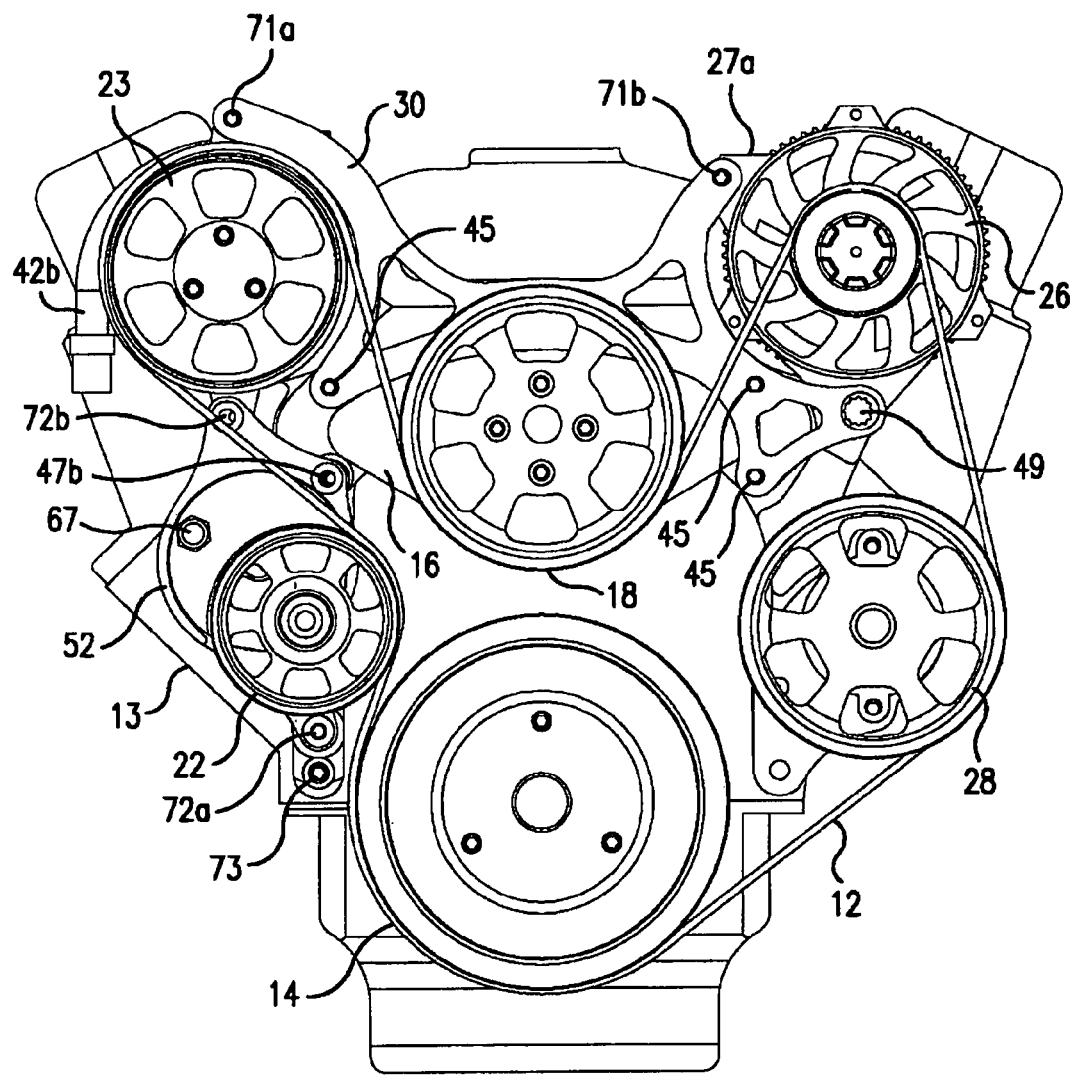
FIG. 3 is a front elevational view of the belt system shown in FIG. 2.
Figure 4:
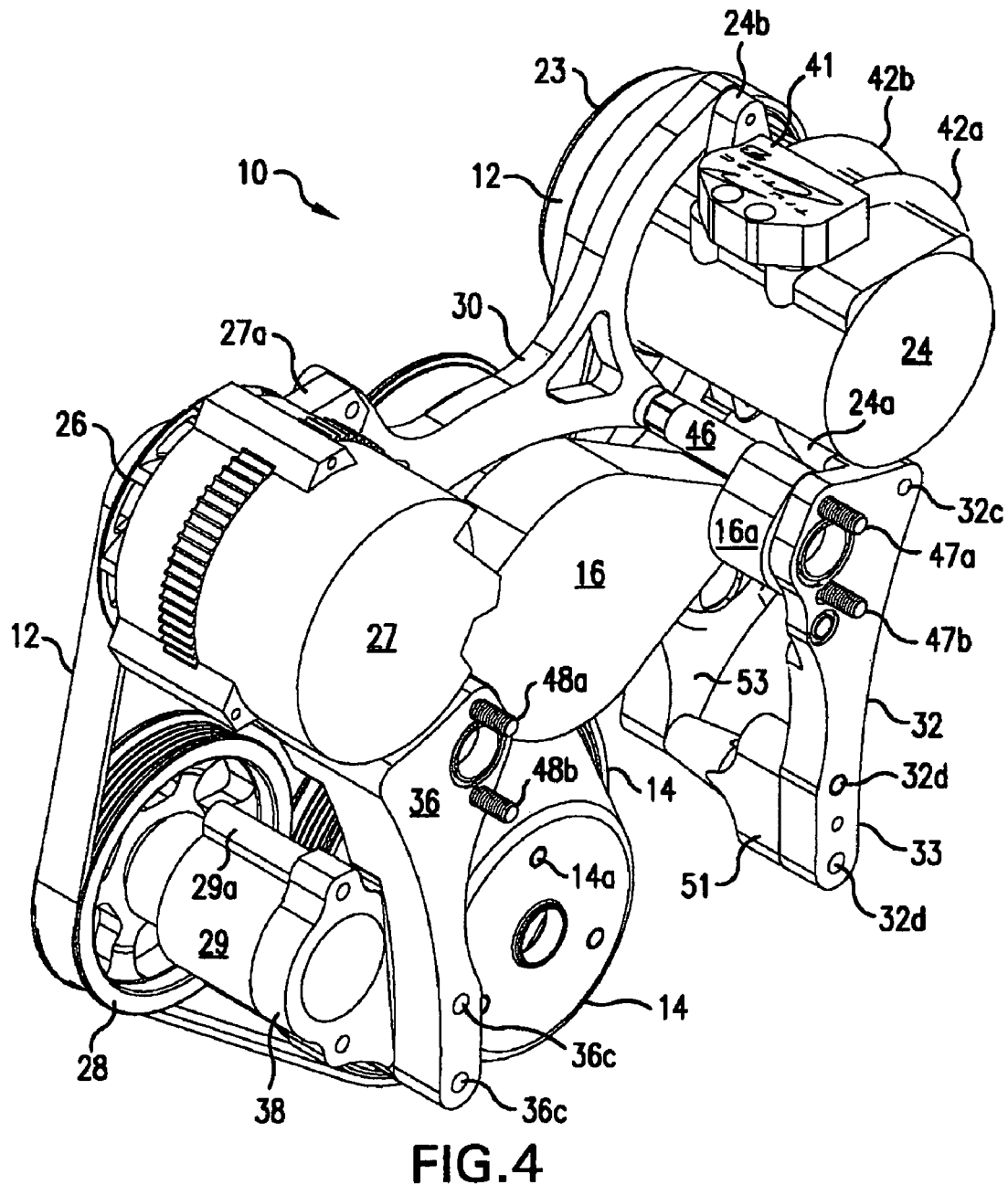
FIG. 4 is a rear perspective view of the belt system in FIG. 2.
Figure 5:
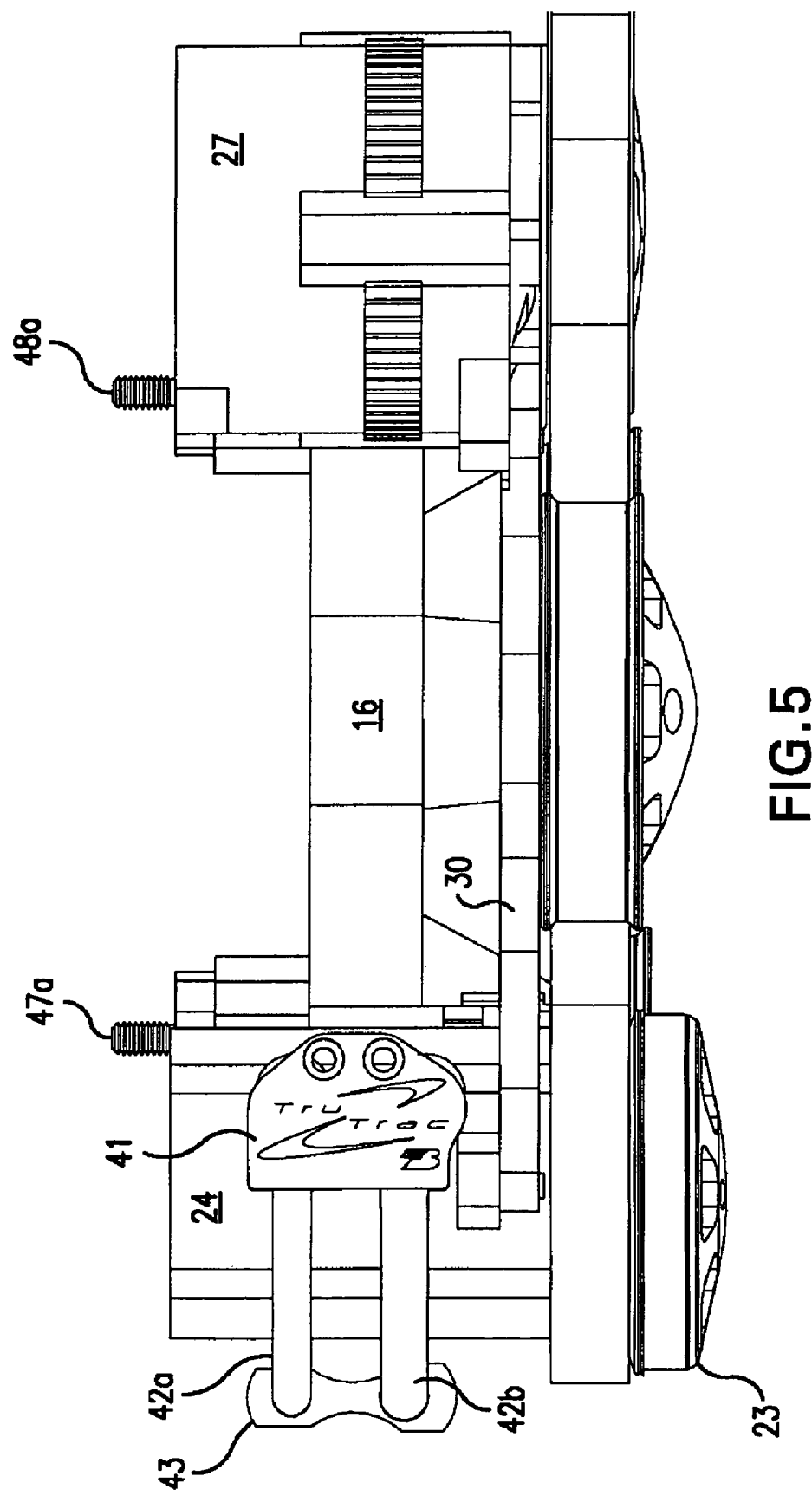
FIG. 5 is a top plan view of the belt system shown in FIG. 2

As shown in FIG. 4, which is a perspective view of the back side of belt assembly 10, a set of threaded studs 47a and 47b extend through compressor bracket 32 to assist in securing assembly 10 to engine block 13, as will be described in detail below. Stud 47a is also used to connect compressor bracket 32 to the bridge bracket 30. Specifically, a corresponding fastener 45 on the front of assembly 10, as shown in FIG. 3, extends through fastener opening 30a in bridge bracket 30, through an opening (not shown) in water pump 16, into spacer nut 46. Stud 47a extends through fastener opening 32a in bracket 32, thereby securing bridge bracket 30 and compressor bracket 32 together. Stud 47b extends through fastener opening 32b in bracket 32 and also through openings (not shown) formed in water pump 16. As will be discussed in more detail below, compressor bracket 32 is also connected to tensioner housing 52 through a separate spacer nut (not shown). In the embodiment depicted in FIG. 4, element 16a is part of water pump 16.

Alternator 27 has alternator pulley 26 mounted on the front thereof through known means. A second set of studs 48a and 48b connect bridge bracket 30 through the two fastener openings 30d to alternator bracket 36 through two fastener openings 36a. Studs 48a and 48b and corresponding fasteners 45 also connect assembly 10 to engine block 13, as described elsewhere herein.

A set of four spacer nuts 46 attach to studs 47a, 47b and 48a, 48b; only one of these spacer nuts 46 is shown in FIG. 4. Spacer nuts 46 provide clearance and permit other components to be mounted directly to studs 47a, 47b and 48a, 48b, rather than mounting any of the other components to water pump 16. Thus, the two sets of studs 47a, 47b and 48a and 48b on the rear of the unit and corresponding fasteners 45 on the front of the unit are used to connect bridge member 30 to the corresponding brackets 32 and 36, respectively, and to engine block 13, minimizing the number of connectors needed and simplifying assembly. The use of standoffs or spacer nuts such as spacer nut 46 are for convenience of assembly. It will be understood that the exact type and number of fasteners and spacer elements used herein are not critical to the invention, and that alternatives such as threaded through shafts and spacers without threads could be used in place of the multiple fastener and spacer nut combination described herein.

Figure 8:
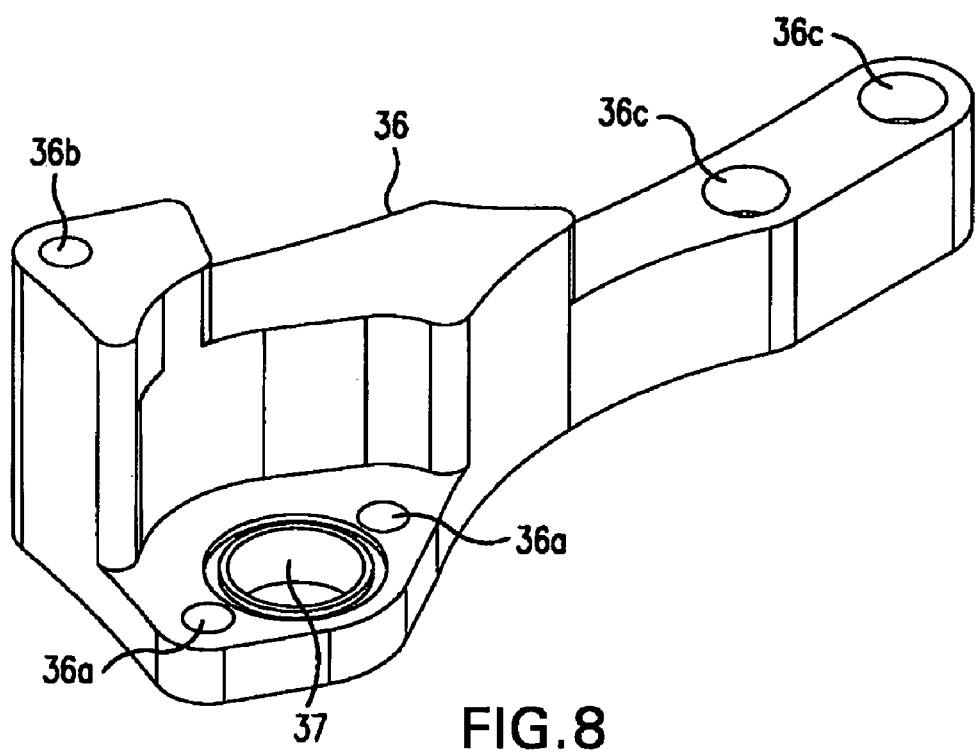
FIG. 8 is a perspective view of an alternator bracket for use in the system shown in FIG. 2.

Alternator bracket 36, shown in detail in FIG. 8, has a shape similar to that of compressor bracket 32, and the two cooperate to act as a spacer to set water pump 16 and the other components off from the face of engine block 13. Alternator 27 is preferably connected to assembly 10 through two connection points; in the embodiment depicted it is connected by fastener 49, which extends through opening 30e on bridge member 30, through a boss (not shown) on alternator 27, into fastener opening 36b on alternator bracket 36. Fastener 71b secures boss 27a on alternator 27 to bridge member 30 through fastener opening 30b. This arrangement provides the necessary support to alternator 27 while using a minimum number of connection points and bracket members.

The above description of compressor bracket 32 and alternator bracket 36 is based on the depiction shown most clearly in FIG. 4, where studs 47a, 47b and 48a and 48b are already mounted in their respective brackets. In practice, however, these studs would preferably be first mounted to the front face of engine block 13, and are located adjacent the two block coolant openings (not shown) on the face of block 13.

Air conditioner compressor bracket 32 is then mounted on studs 47a and 47b, with port 39 open to one of the block coolant openings. Similarly, alternator bracket 36 is mounted on studs 48a and 48b, with its port 37 corresponding to the other of the block coolant openings. It will be understood by those of skill in the art that these port connections are needed to connect water pump 16 to the internal coolant porting (not shown) in the engine block 13.

After compressor bracket 32 and alternator bracket 36 are in place, water pump 16 is also mounted on studs 47a, 47b, 48a and 48b, through its various fastener openings (not shown). It will also be understood that various hoses and the like will also be attached to water pump 16, and various o-rings will be used in this system to prevent leakage from the coolant system (not shown), and may be used in place of the typical gaskets and sealants for superior sealing. Since the details of coolant systems and water pumps are well known in the art, these details will not be shown or described herein.

Crankshaft pulley 14 includes a set of fastener openings 14a by which pulley 14 is mounted on the harmonic balancer (not shown) of a crankshaft (not shown). Such a connection is known in this art and is not shown in detail here; thus, crankshaft pulley 14 is the only element in assembly 10 that is not secured to the other elements through the various brackets described herein.

Figure 9:
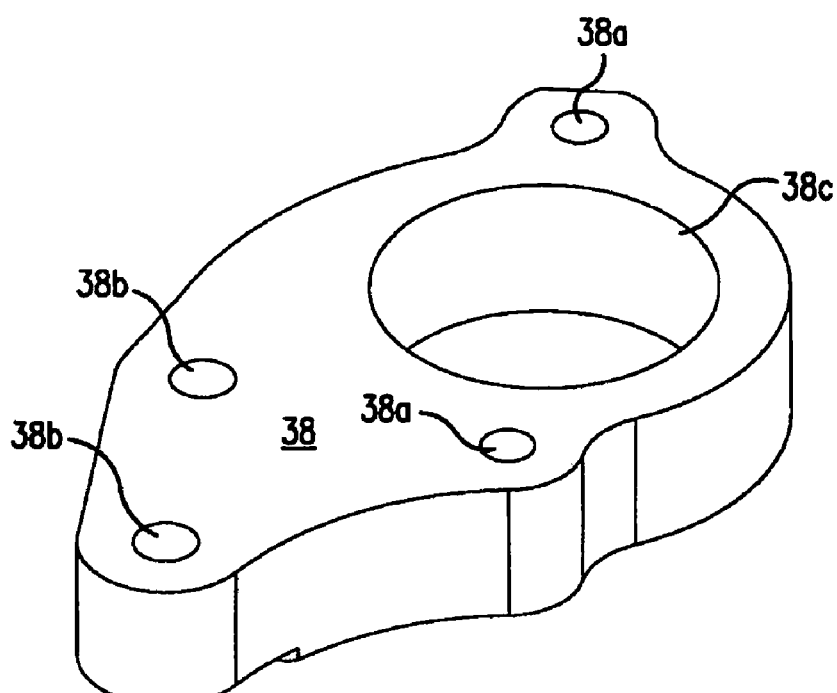
FIG. 9 is a perspective view of the power steering bracket for the system shown in FIG. 2.
Figure 10:
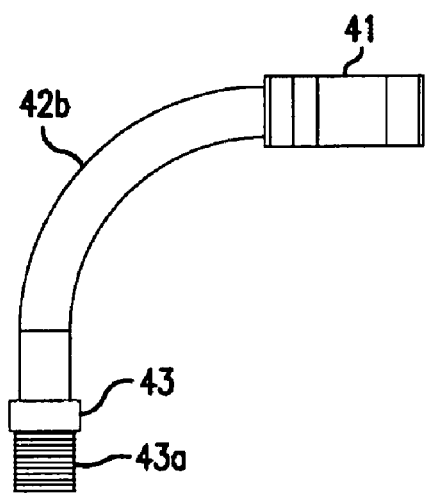
FIG. 10 is a side elevational view of the air conditioning manifold for use in the system shown in FIG. 2.
Figure 11:
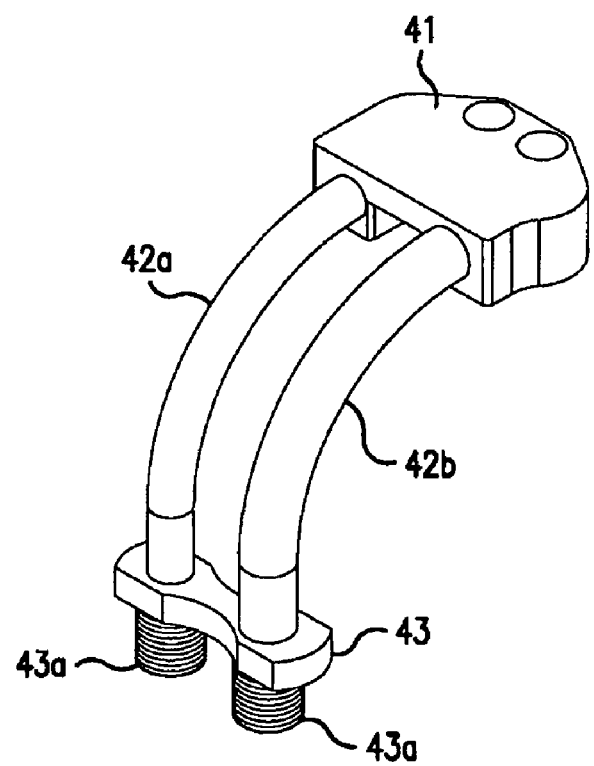
FIG. 11 is a perspective view of the manifold shown in FIG. 10.
Figure 12:
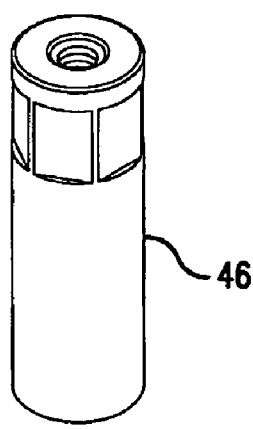
FIG. 12 is a perspective view of one of the spacers used between the air conditioner compressor bracket and the bridge bracket in the system shown in FIG. 2.

Power steering pump 29 may be of a known design and has a pump pulley 28 mounted on the front thereof. A separate power steering bracket 38, which is shown in FIG. 9, is connected to alternator bracket 36 through a pair of fastener openings 38b and 36c, respectively. Pump 29 is then secured to the separate power steering pump bracket 38, through a fastener (not shown) that extends through fastener openings 38a and into boss 29a formed on the body of power steering pump 29 and another boss (not shown) on the bottom of pump 29. Opening 38c is formed in bracket 38 simply to reduce weight. The connections of power steering pump 29 to the steering mechanism of the vehicle is not shown for simplicity and will be well known to those in the art.

The mounting of tensioner 20 provides that the entire assembly remains within the envelope of the overall engine block 13, and tensioner 20 is also mounted to the various brackets instead of to engine block 13.

As shown most clearly in FIGS. 2, 4, 5 and 13, bracket 32 has an arm portion 33 that extends downwardly, and tensioner housing 52 has a corresponding arm portion 53 that also extends downward from the main body thereof to permit the proper clearances. A spacer 51 is used to locate and secure tensioner housing 52 to compressor bracket 32 by means of fasteners 73 (only one of which is shown) extending through fastener openings 32d, into spacer 51, and through fastener opening 52a. The top portion of tensioner housing 52 is secured to air conditioning compressor 24 through fastener 72b extending through fastener opening 52b to boss 24c located at the lower front portion of air conditioning compressor 24. Tensioner housing 52 is also secured on lower stud 47b through fastener opening 52c, with a spacer nut (not shown) similar to spacer nut 46; this spacer nut may be shorter than the others in order to accommodate the mounting of tensioner housing 52. Additional benefits and features of tensioner 20 are discussed below.

It will be understood by one of skill in the art that the specific size and shapes of the various brackets used in this invention are not critical, as one could modify these brackets, spacers and the like depending on the size and shape of the engine block and other components. By way of example, power steering bracket 38 and alternator bracket 36 could be formed as a single piece. Furthermore, air conditioning bracket 32 and alternator bracket 36 could be formed as a single piece, shaped as needed to fit on the face of engine block 13.

It will also be understood that certain elements of this design, such as power steering and air conditioning, are optional and these elements can be omitted without changing the overall benefits of this invention by a modification of the brackets and connections. For example, if the air conditioning compressor is not used in a specific model, spacer 51 can be secured directly to engine block 13 and tensioner housing 52 would be connected to spacer 51 through opening 52a, to lower stud 47b through opening 52c and to opening 30a on bridge bracket 30. It will also be understood that in such a case, bridge bracket 30 would be modified somewhat to eliminate certain openings. Since air conditioning compressor 24 is not being used in such a case, bracket 32 would also be made significantly smaller as it is only needed to mount water pump 16. Opening 30c in bridge bracket would be secured to stud 47a with a spacer nut. Again, the size and configurations of the various brackets, spacers and/or standoffs will depend on the specific sizes and configurations of the components being used.

As noted above, the unique design of tensioner 20 provides additional benefits to this invention. As is known in the art, tensioners are used in serpentine belt systems to provide the proper amount of belt tension to prevent belt slippage. This design presents several key improvements over known tensioners.

Figure 13:
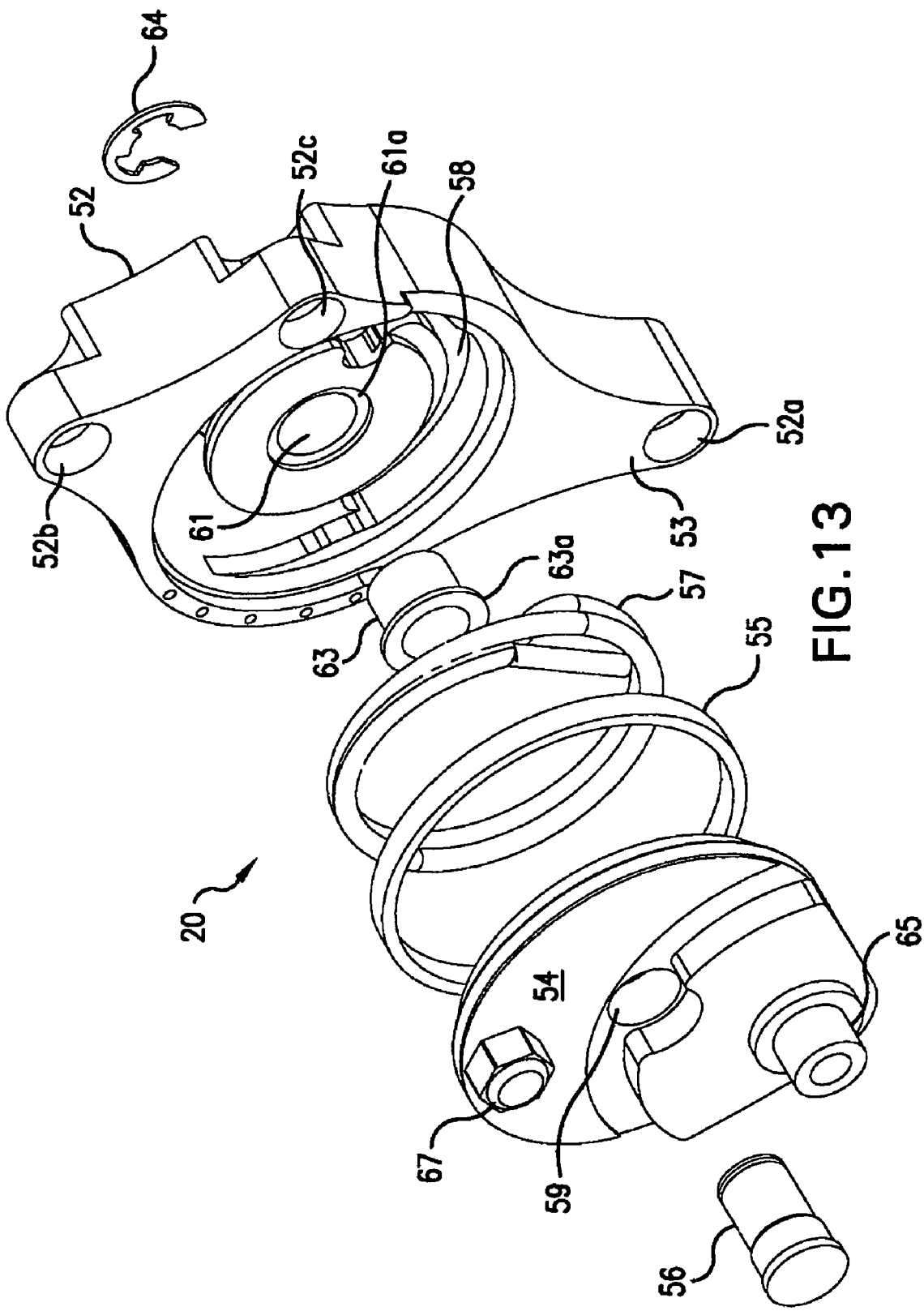
FIG. 13 is an exploded view of the tensioner assembly used in the serpentine belt system shown in FIG. 1.
Figure 15:
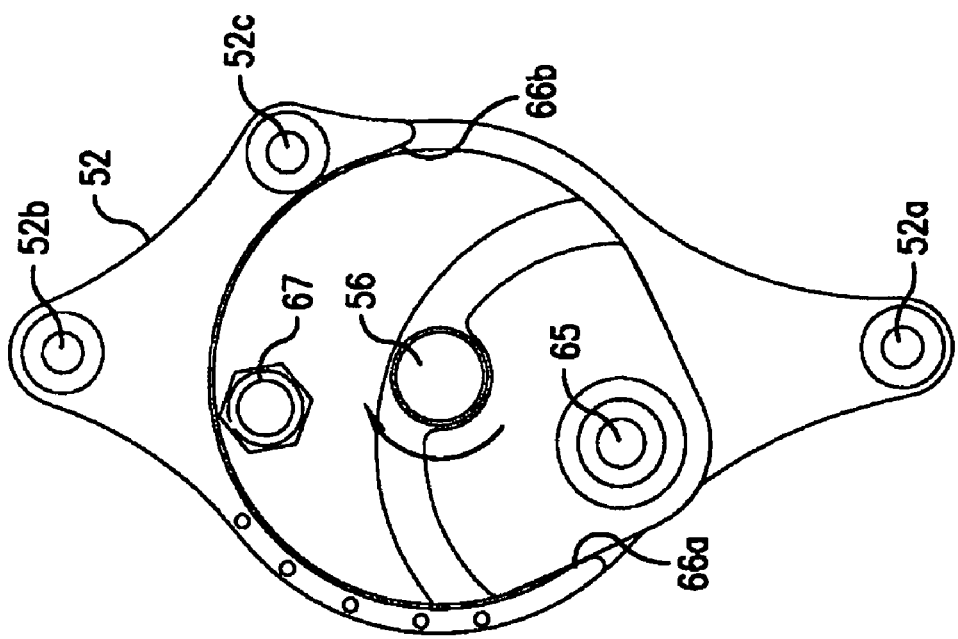
FIG. 15 is a top plan view of the assembled tensioner as shown in FIG. 13, with the tensioner at the maximum limit.
Figure 14:
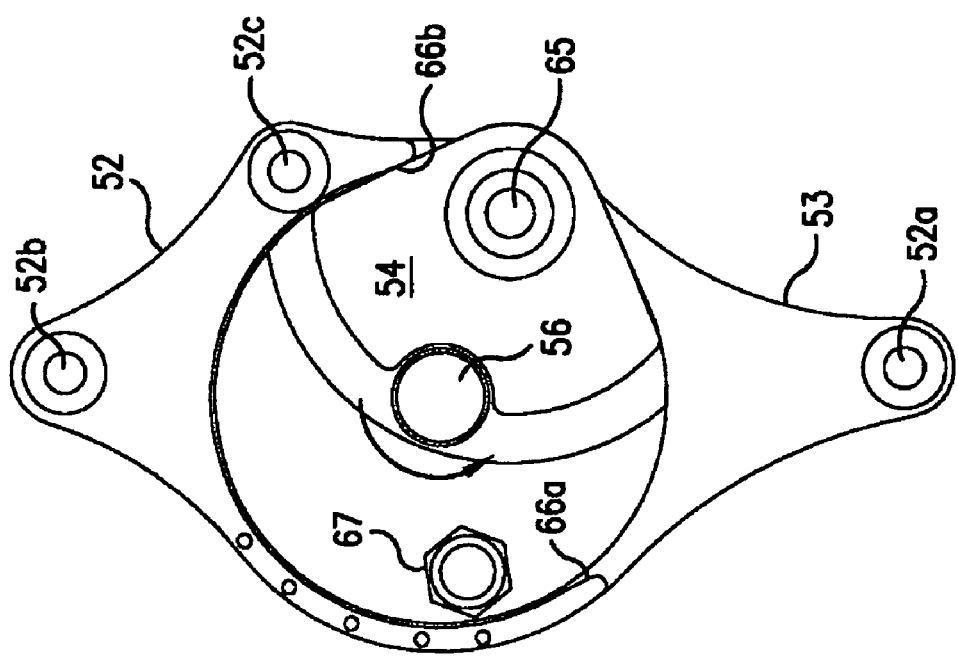
FIG. 14 is a top plan view of the assembled tensioner as shown in FIG. 13, with the tensioner at the minimum limit.
Figure 16:
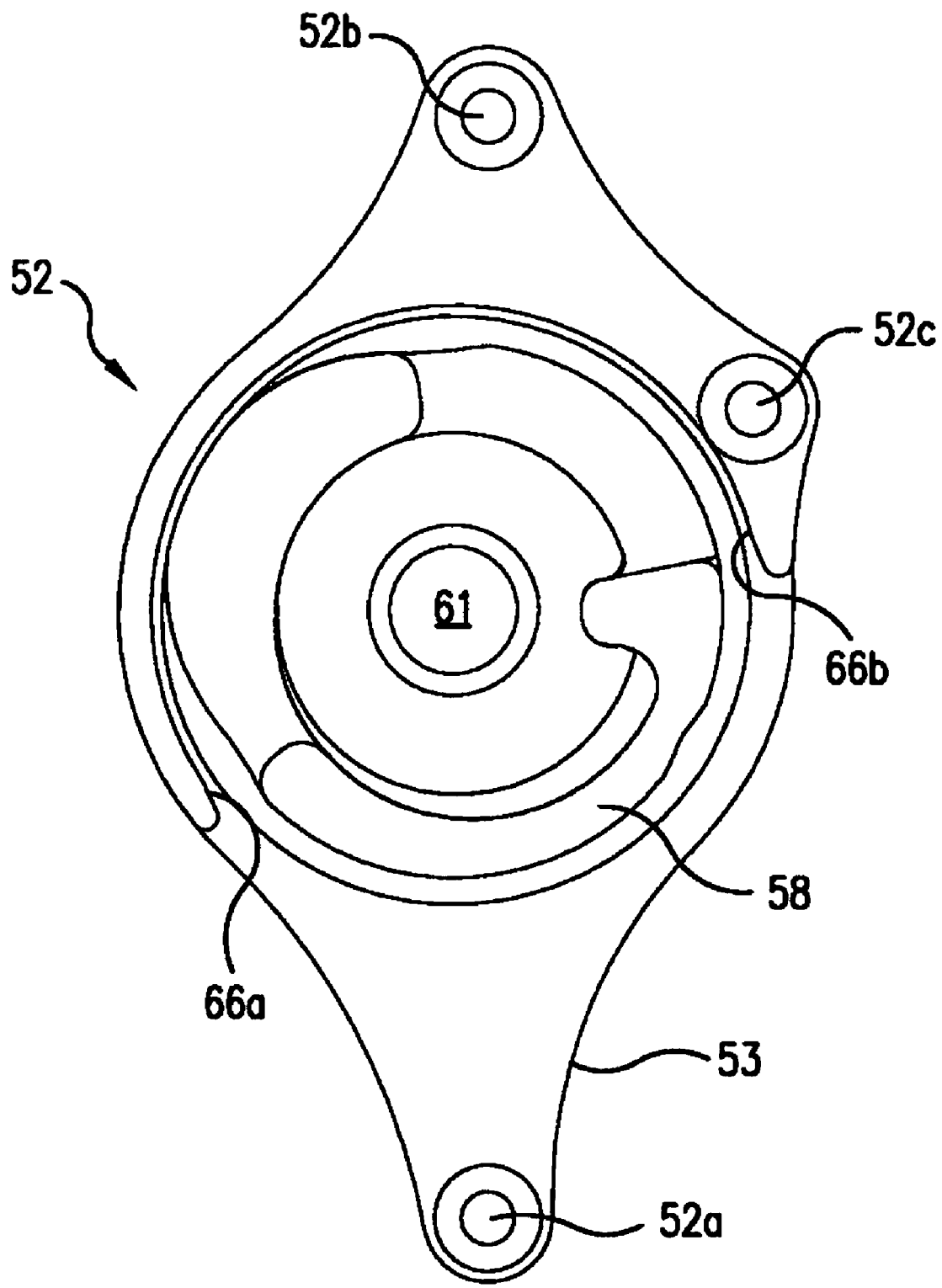
FIG. 16 is a top plan view of the tensioner housing used in the tensioner shown in FIG. 13, with the tensioner cover removed.
Figure 17:
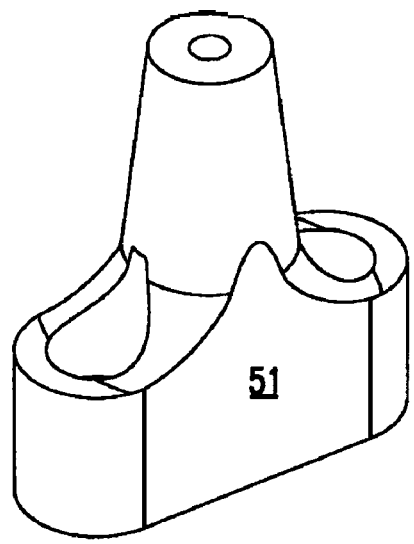
FIG. 17 is a perspective view of the spacer used to secure the tensioner housing to the air conditioning bracket in the serpentine belt system shown in FIG. 2.
Figure 18:
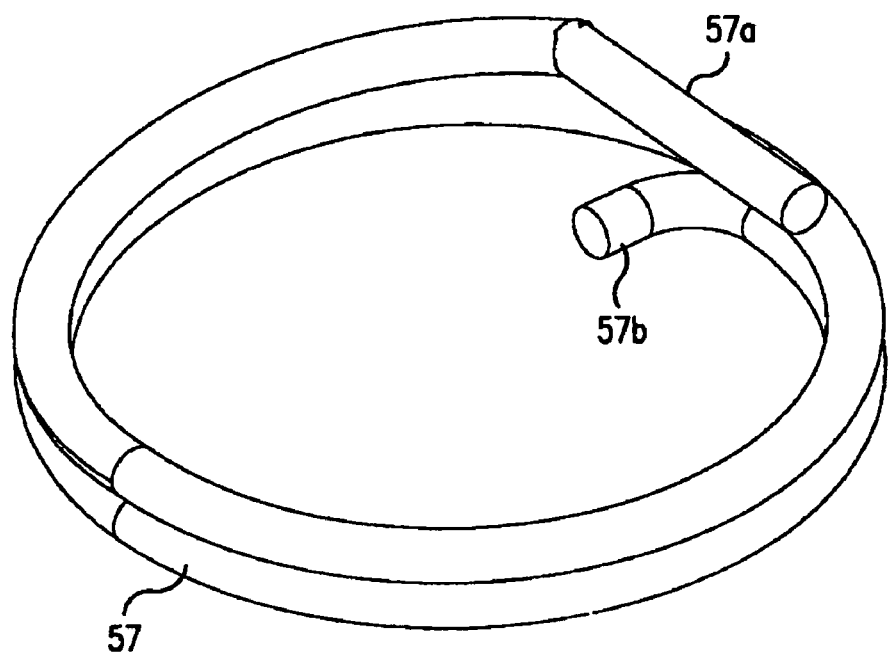
FIG. 18 is a perspective view of the spring used in the tensioner shown in FIG. 13.
Figure 19:
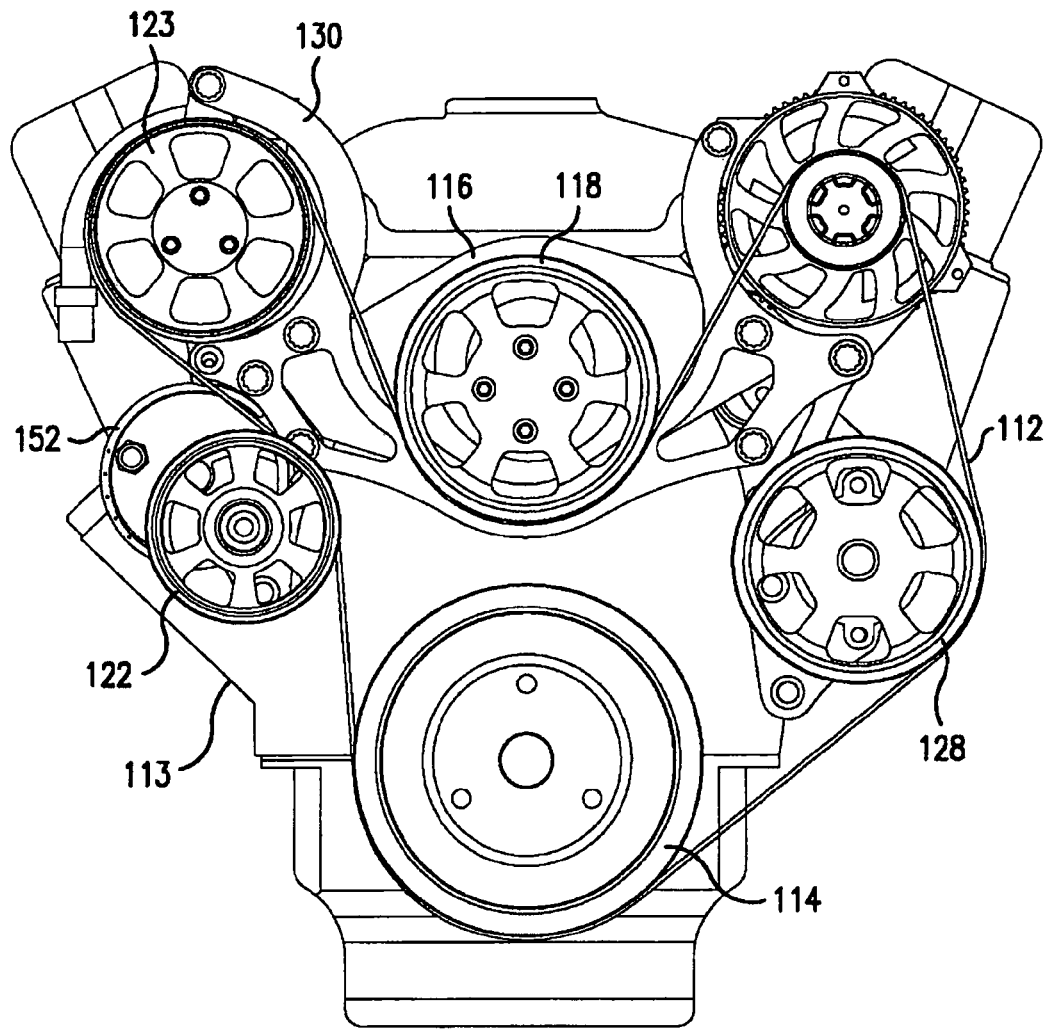
FIG. 19 is a front elevational view of an embodiment of a serpentine belt system and associated pumps, compressors, pulleys and related parts, shown in connection with a big block Chevrolet engine.
Figure 20:
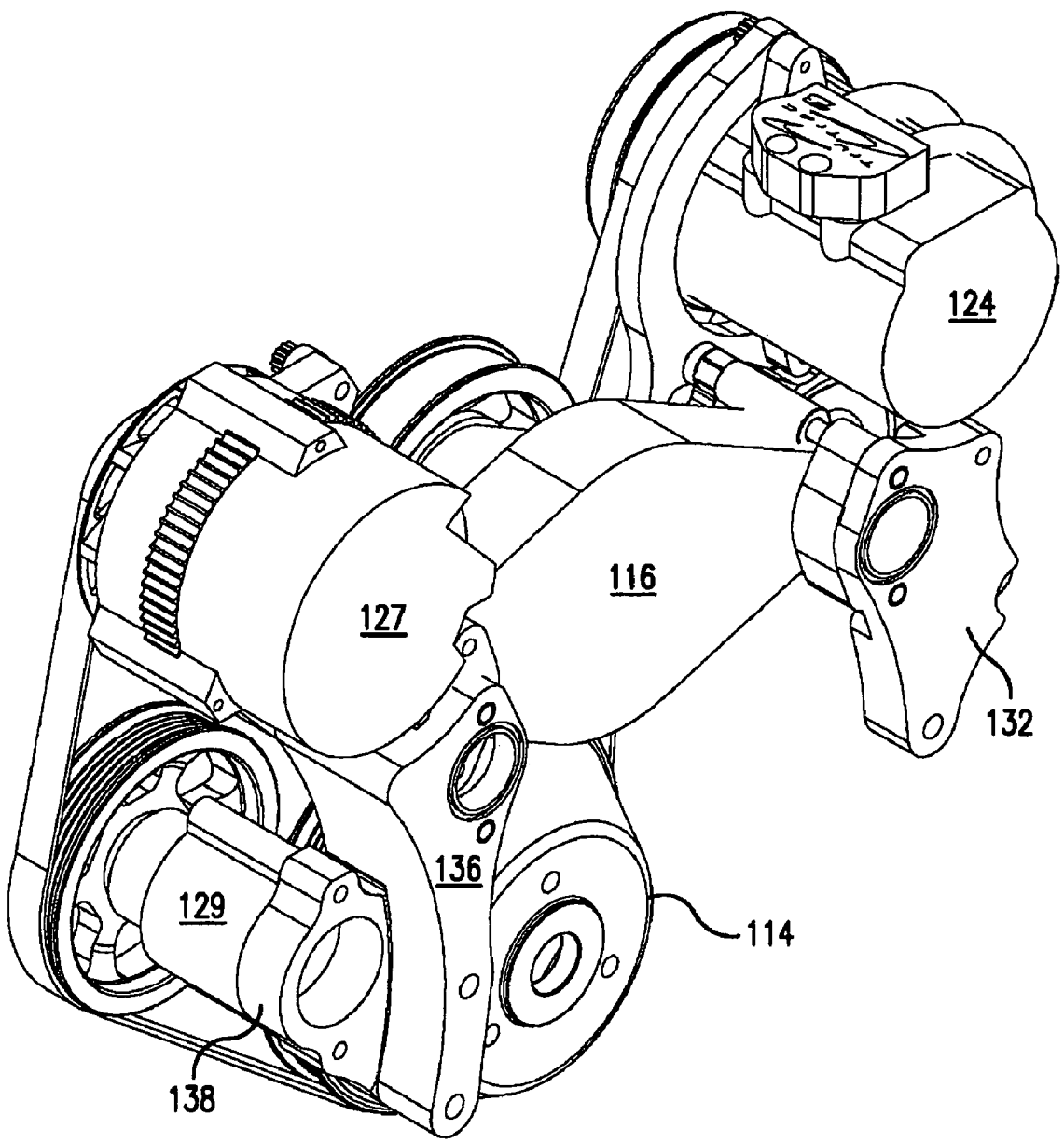
FIG. 20 is a rear perspective view of the belt system shown in FIG. 19.

The overall structure of tensioner 20 is shown in the exploded view of FIG. 13, while the operation of tensioner 20 is shown in FIGS. 14 and 15. Housing 52 has tensioner spring 57 housed in groove 58 and, as shown most clearly in FIG. 18, spring 57 has a pair of ends 57a and 57b shaped to fit within groove 58. Bushing 55 is also mounted in housing 52 and locates cover 54, as well as acts as a bearing surface for the rotation of cover 54.

As can be seen in FIGS. 14 and 15, tensioner 20 is rotatable about axle 56, which passes through cover opening 59 and engages bushing 63, which then extends through opening 61 in housing 52, with this structure being held in place by means of c-clip 64. An integral bearing member 63a is formed on bushing 63 and provides support in an axial direction against the bearing surface 61a formed around the circumference of opening 61. This arrangement permits cover 54 to rotate about the axis of tensioner axle 56, with spring 57 providing the necessary bias to return cover to the preferred location.

Tensioner pulley 22 is mounted on shaft 65 formed as a part of tensioner cover 54. Shaft 65 is offset from the axis of axle 56 so that rotation of cover 54 will swing pulley 22 toward or away from belt 12. This will either increase or decrease the tension in belt 12 as needed in the system.

Housing 52 is formed with two external positive stops 66a and 66b; cover 54 is shaped so that one of its sides contacts positive stop 66a at a point when cover 54 is rotated clockwise as shown in FIG. 15, corresponding to maximum movement of tensioner pulley 22. Similarly, the other side of cover 54 will contact positive stop 66b when cover 54 is rotated in a counterclockwise direction, corresponding to minimum movement of tensioner pulley 22, as shown in FIG. 14. Release nut 67 is formed on cover 54 and is used to rotate tensioner 20 as needed to unload spring 57 to permit serpentine belt 12 to be fitted over tensioner pulley 22. The amount of movement of tensioner pulley 22 can be modified by changing parameters such as the location of positive stops 66a and/or 66b, the size and shape of cover 54 and other dimensions, as will be obvious to one of ordinary skill in the art.

As noted previously, one of the benefits of this design is the compact nature of the system, whereby the entire assembly 10 can fit in the envelope of engine block 13. One of the ways this is accomplished is through the unique design of air conditioning manifold 41, which mounts to the top of air conditioning compressor 24 by means of bolts or similar fasteners (not shown). Two separate tubes 42a, 42b extend out from manifold 41 and curve along the body of compressor 24 and extend to a one piece member 43. Tubes 42a, 42b are preferably brazed into member 43, which then provides two separate threaded ports to connect the necessary air conditioning porting (not shown) to the inlet/outlet tubes 42a, 42b. This permits the ports 43a to be below compressor 24 without increasing the overall size of the unit unnecessarily, and the use of one-piece member 43 makes the unit rigid without the need for additional structure.

In the embodiment depicted, tube 42a is the pressure or outlet tube while tube 42b is the return or inlet tube. In the embodiment depicted in FIG. 10, the angle created by tubes 42a, 42b between the outlet of manifold 41 and the two threaded ports 43a is approximately 90 degrees.

As mentioned above, the foregoing description has been in connection with a small block Chevrolet engine. FIGS. 19-22 depict an alternative embodiment showing a serpentine belt system 110 for use in connection with a big block Chevrolet engine. Not all the details are shown for this embodiment, as many of the components and their features will be similar or identical to those described above with regard to the embodiment shown in, e.g., FIG. 1. Where similar or identical structure is used, similar numbers are used with the addition of the prefix "1."

Figure 21:
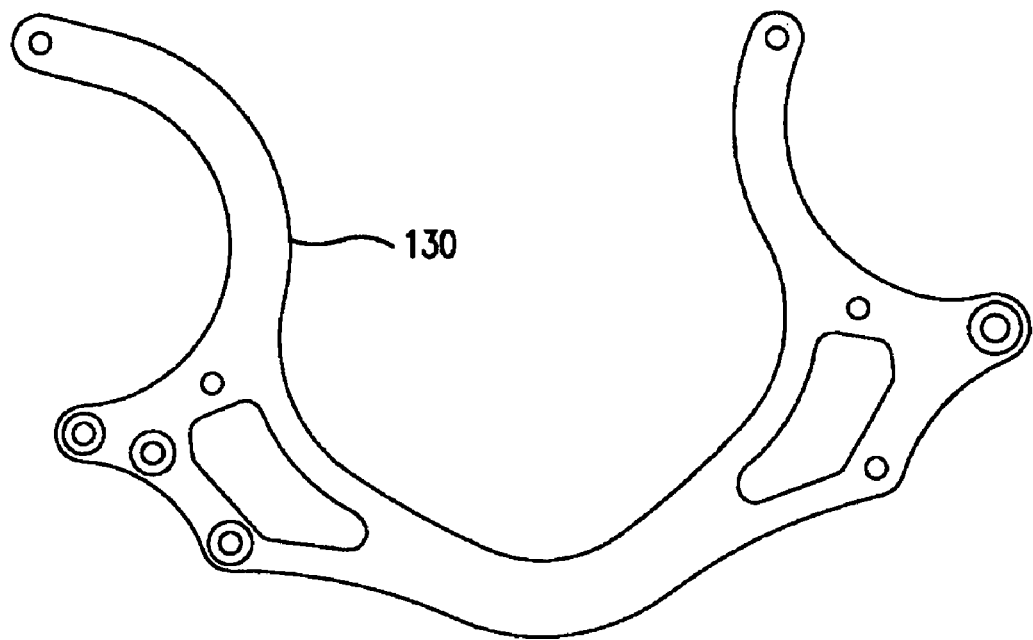
FIG. 21 is a top plan view of the bridge bracket for use in the belt system shown in FIG. 19.
Figure 22:
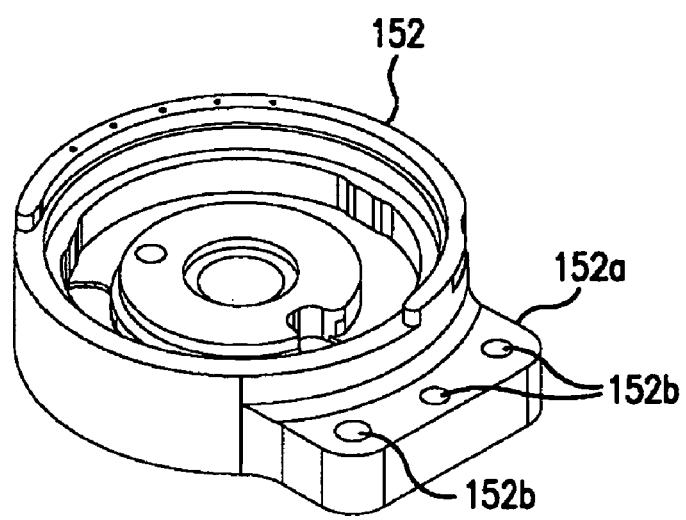
FIG. 22 is a perspective view of a tensioner housing used in the belt system shown in FIG. 19.

For example, bridge bracket 130 shown in FIG. 21 is similar to bridge bracket 30 but with a different shape to accommodate both the different connection points for the components to which it is connected and for the increased size of engine block 113. Air conditioner compressor bracket 132 and alternator bracket 136 will be similarly modified. Tensioner housing 152 has an ear 152a formed thereon to accommodate various openings 152b to secure housing 152 to bridge member 130. Other modifications for use with a big block engine will be apparent to one of skill in the art.

As discussed previously, a further embodiment can be seen in FIGS. 23-33, which depict a serpentine belt system preferably for use on a Ford engine or engines having similar characteristics. Many of the components of the system are similar to those discussed above in connection with the first two embodiments. Where similar or identical structure is used, similar numerals will be used with the addition of the prefix "2." While the depicted embodiment is for a small block Ford engine, one of skill in the art will recognize that minor dimensional changes can be made to accommodate a large block engine.

In the third embodiment, timing cover 80 is used to replace a stock timing cover on engine block 213, in addition to a bridge bracket 230 to mount the various components, and timing cover 80 takes the place of several of the additional brackets used in previous embodiments.

The arrangement of components in this embodiment is somewhat different than in prior embodiments, while certain elements are substantially identical. As seen in FIGS. 23-26, engine block 213 has an air conditioner compressor 224, alternator 227, tensioner 220, water pump 216 and power steering pump 229 mounted in a manner described below. Belt 212 is driven by crankshaft pulley 214 and is connected to and drives air conditioner clutch cover 223, power steering pulley 228, water pump pulley 218 and alternator pulley 226, while tensioner pulley 222 is also connected to provide the proper tension to belt 212. As seen most clearly in FIG. 24, the arrangement of components permitted by this structure permits the entire assembly to fit within the envelope of engine block 213 (including the cylinder heads and the like).

In the depicted method of assembly, four mounting studs 247a, 247b, 248a, 248b extend into engine block 213. Timing cover 80 is mounted on these studs 247a,b and 248a,b, through openings 80b, 80c, 80d and 80e. These studs 247a,b and 248a,b are mounted adjacent to respective block coolant openings (not shown) in engine block 213.

Lower surface 85 of timing cover 80 is mounted to an oil pan (not shown) and therefore it is preferable to provide a gasket or other seal in the groove 86 formed in lower surface 85. A sealant such as RTV silicone is preferably applied to the back surface of timing cover 80 and to the face of engine block 213 to which timing cover 80 is mounted.

Opening 83 extends through timing chain cover 80 to permit the crankshaft (not shown) to extend therethrough for mounting the crankshaft pulley 214 in a known manner. A recessed area 81 is formed near the center of timing cover 80 to assist in the mounting and location of water pump 216. A pair of ports 82 extend through timing cover 80 to permit hydraulic connection of water pump 216 with the block coolant openings (not shown) in engine block 213. Water pump 216, which is preferably one manufactured by Ford Motor Co., is mounted on the four studs 247a,b and 248a,b extending through timing cover 80. Spacer nuts of different sizes are used on the portions of studs 247a,b and 248a,b that extend through water pump 216 to assist in the mounting of other elements described herein. A series of other fasteners 88 are used to secure water pump 216 to timing cover 80. The actual arrangement, type and number of fasteners used to connect the various components described herein is not critical to the invention as long as the proper support for the various components is provided.

Serpentine belt system 210 may be used with or without power steering; in the embodiment depicted herein, power steering pump 229 is used. Power steering bracket 90, shown most clearly in FIG. 31, has an opening 90a therein to eliminate weight. Power steering bracket 90 is secured to timing cover 80 through fasteners (not shown) extending through the corresponding openings 90b and fastener openings 80e. Power steering pump 229 is then secured to bracket 90. As shown most clearly in FIG. 27, a recessed area 84 is provided on timing cover 80 for the mounting of bracket 90 and to provide the proper spacing.

Figure 33:
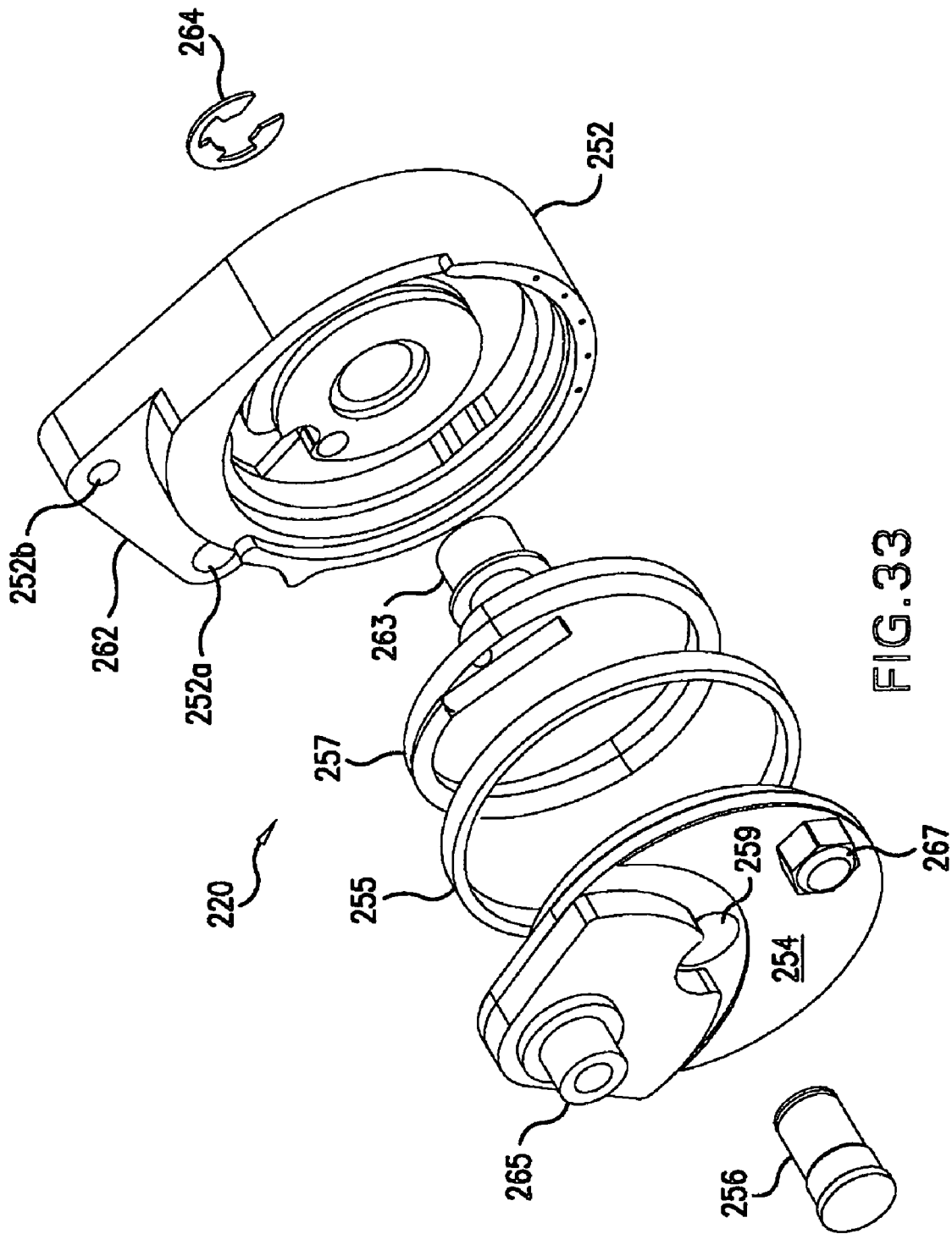
FIG. 33 is an exploded perspective view of the tensioner for use in connection with the serpentine belt system shown in FIG. 23.

Tensioner 220 performs in a manner similar to that described above for the other embodiments, but tensioner housing 252 is shaped somewhat differently; the exploded assembly of tensioner 220 is shown in FIG. 33. Flange 262 is formed on one side of tensioner housing 252 and has two openings 252a and 252b formed therein for mounting to timing chain cover 80. These two openings are secured to the two studs 248a,b that extend from the engine block 213 and through both timing cover 80 (through openings 80d and 80e) and water pump 216. It will be understood by those of skill in the art that spacer nuts (not shown) will be used to provide the proper clearance between water pump 216 and the back of tensioner housing 252. As an additional means of securing tensioner 220 to timing cover 80, an opening (not shown) is provided in the back of tensioner housing 256 into which a set screw (not shown) may be inserted, and an hourglass shaped spacer nut 91 is attached to the set screw. Another fastener 88 may be inserted through the back of timing chain cover 80 through opening 80i and into the hourglass shaped spacer nut 91.

As noted, the operation of tensioner 220 is substantially identical to the operation of tensioner 20 described above, and comprises a cover 254, tensioner bushing 255, tensioner spring 257, bushing 263, axle 256 and c-clip 264 assembled as shown in FIG. 33. Shaft 265 and release nut 267 are located on cover 254.

Bridge bracket 230 is used to assist in securing the various components and to provide adequate spacing. A center opening 230a is provided to permit a portion of water pump 216 to extend therethough to locate bridge bracket 230, and a series of fastener openings 230b-230f are also provided. Bridge bracket 230 is secured to timing cover 80 by means of fasteners 88 extending through these various fastener openings.

Air conditioner compressor 224 is secured to timing chain cover 80 by means of a fastener (not shown) extending into fastener opening 80f. Boss 224a on air conditioner compressor 224 is also fastened to opening 230b on bridge bracket 230.

Figure 23:
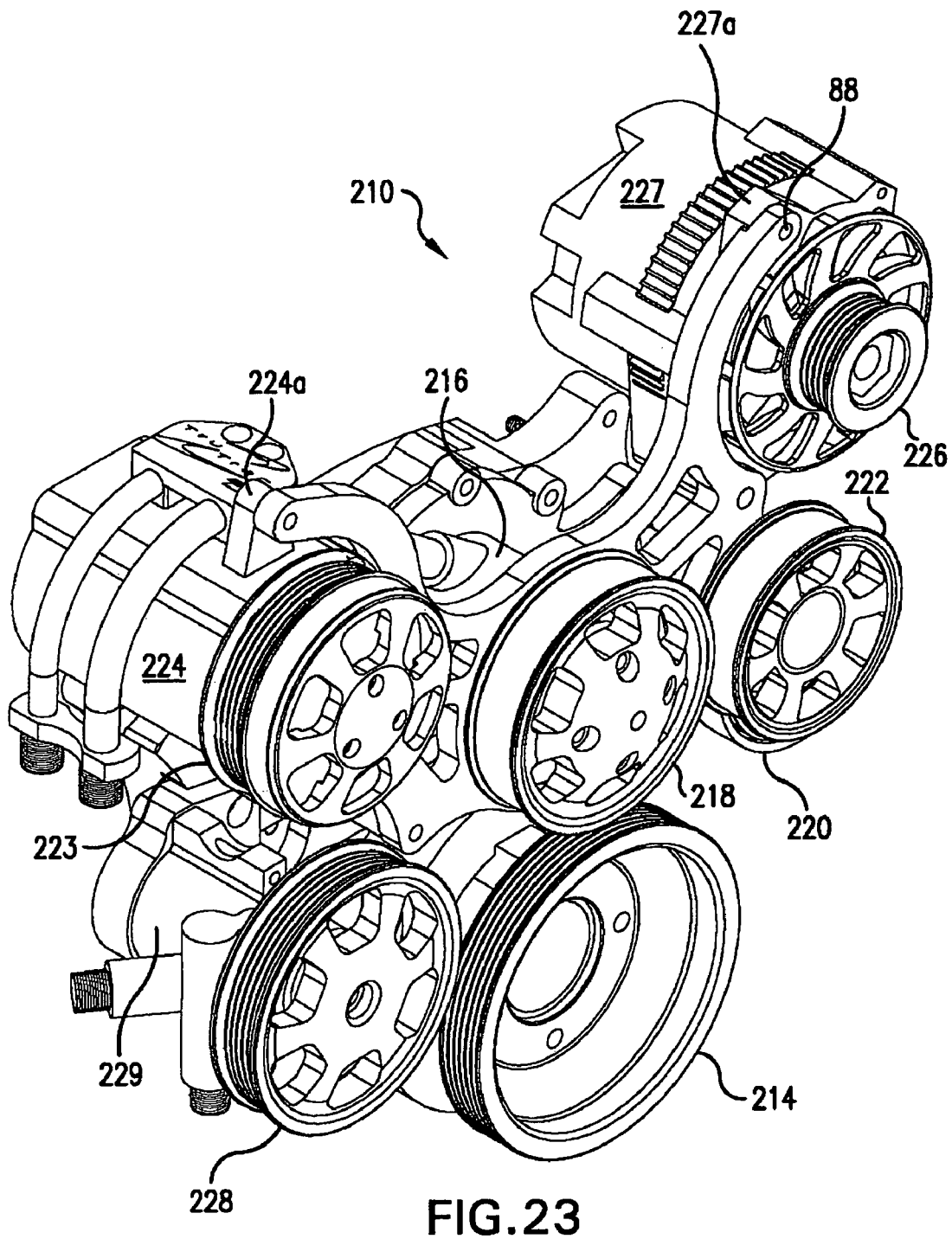
FIG. 23 is a perspective view of a serpentine belt system in accordance with a third embodiment of this invention, without the belt attached.
Figure 24:
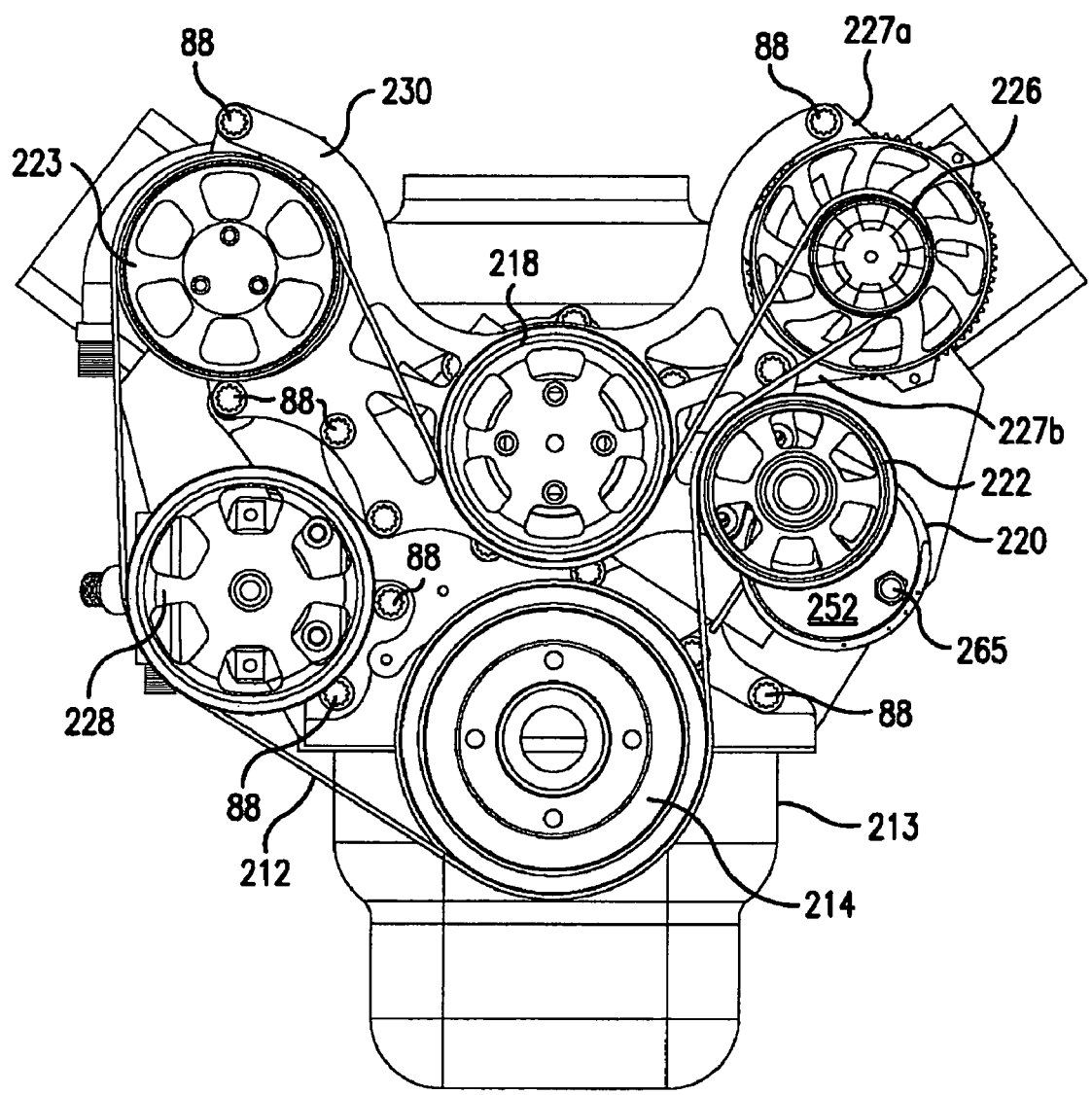
FIG. 24 is a front plan view of the serpentine belt system shown in FIG. 23, depicted as mounted on an engine block in a typical application.
Figure 25:
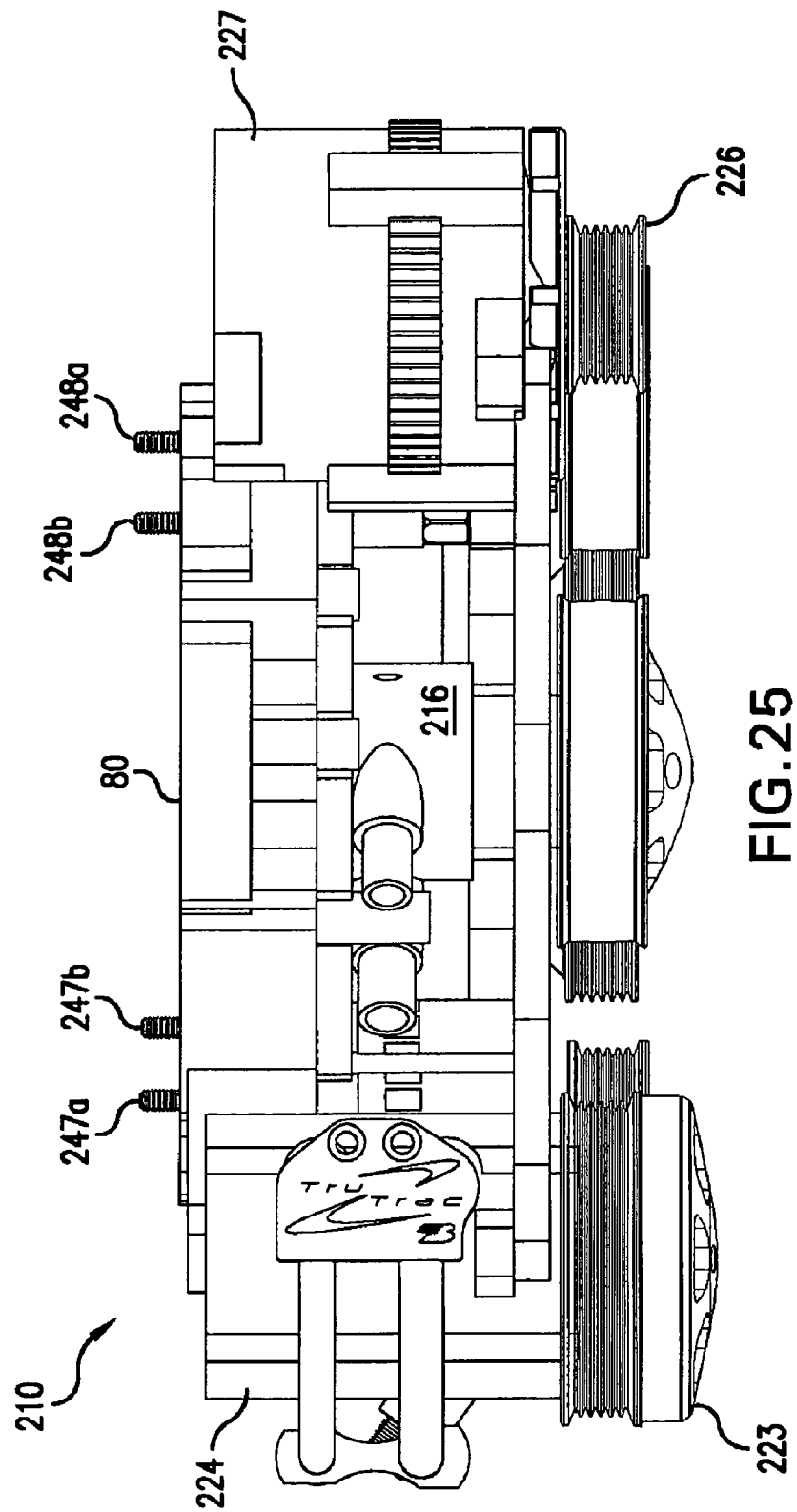
FIG. 25 is a top plan view of the serpentine belt system shown in FIG. 23.
Figure 26:
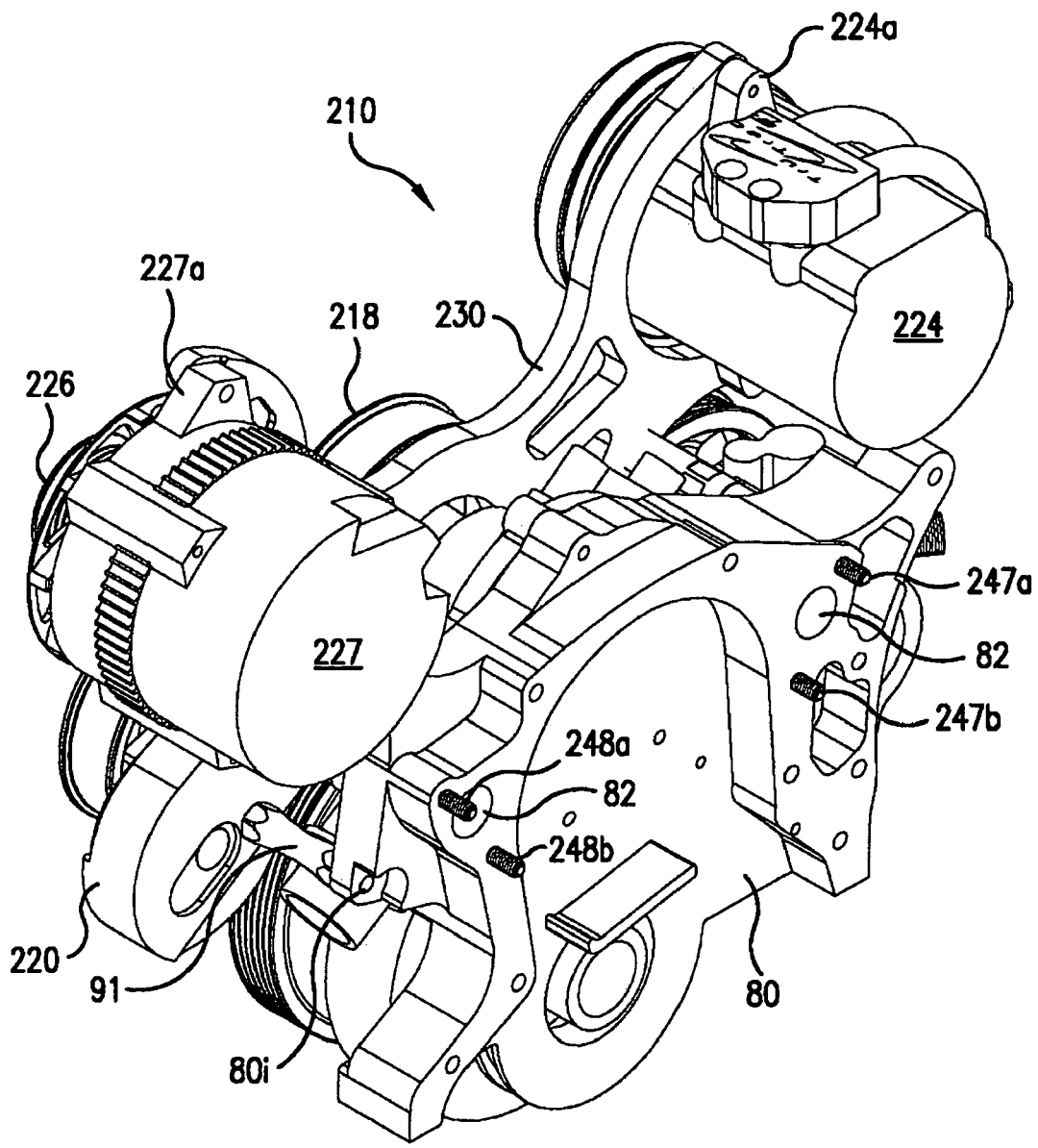
FIG. 26 is a rear perspective view of the serpentine belt system shown in FIG. 23.
Figure 27:
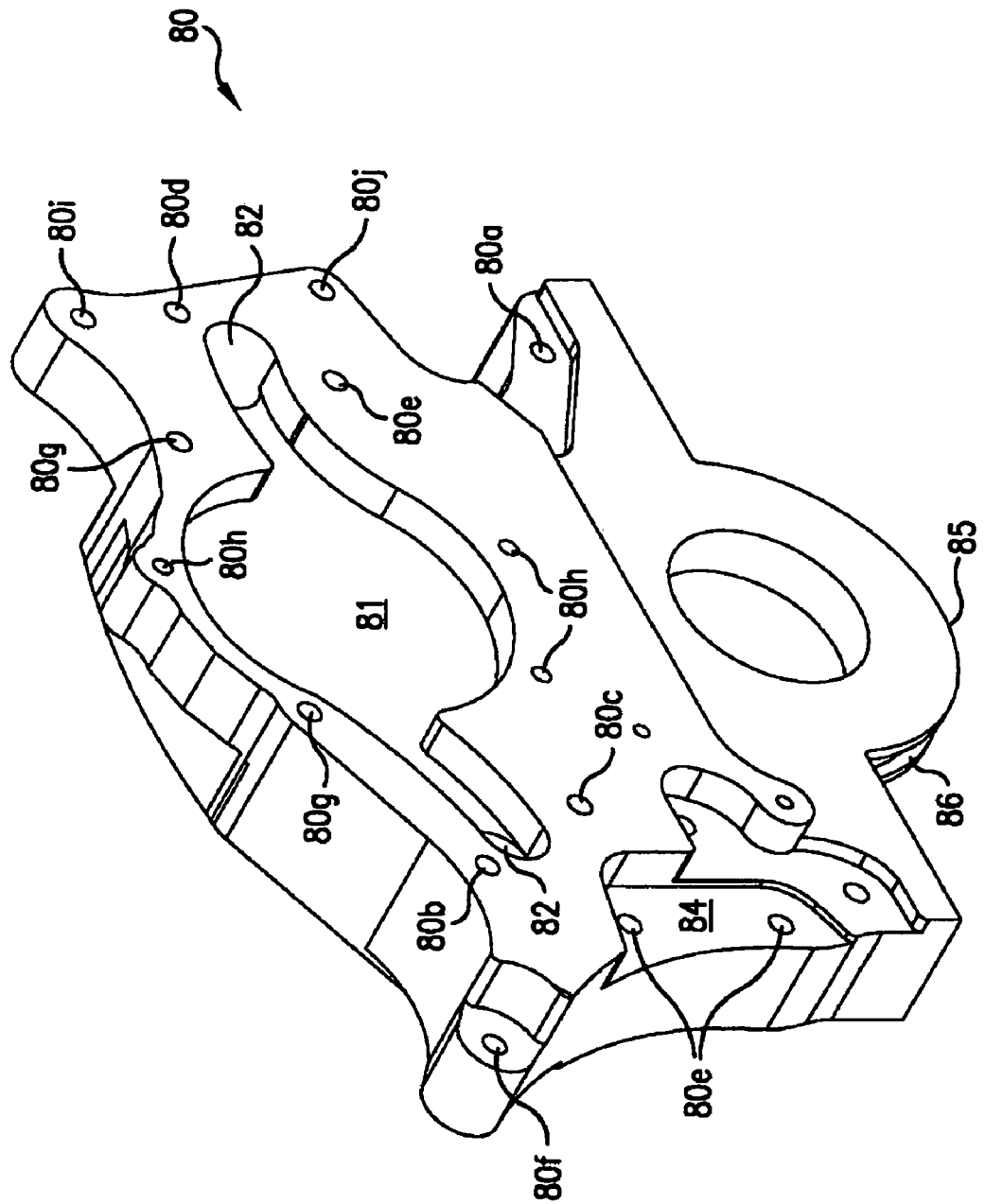
FIG. 27 is a perspective view of a timing chain cover for use in connection with the serpentine belt system shown in FIG. 23.
Figure 28:
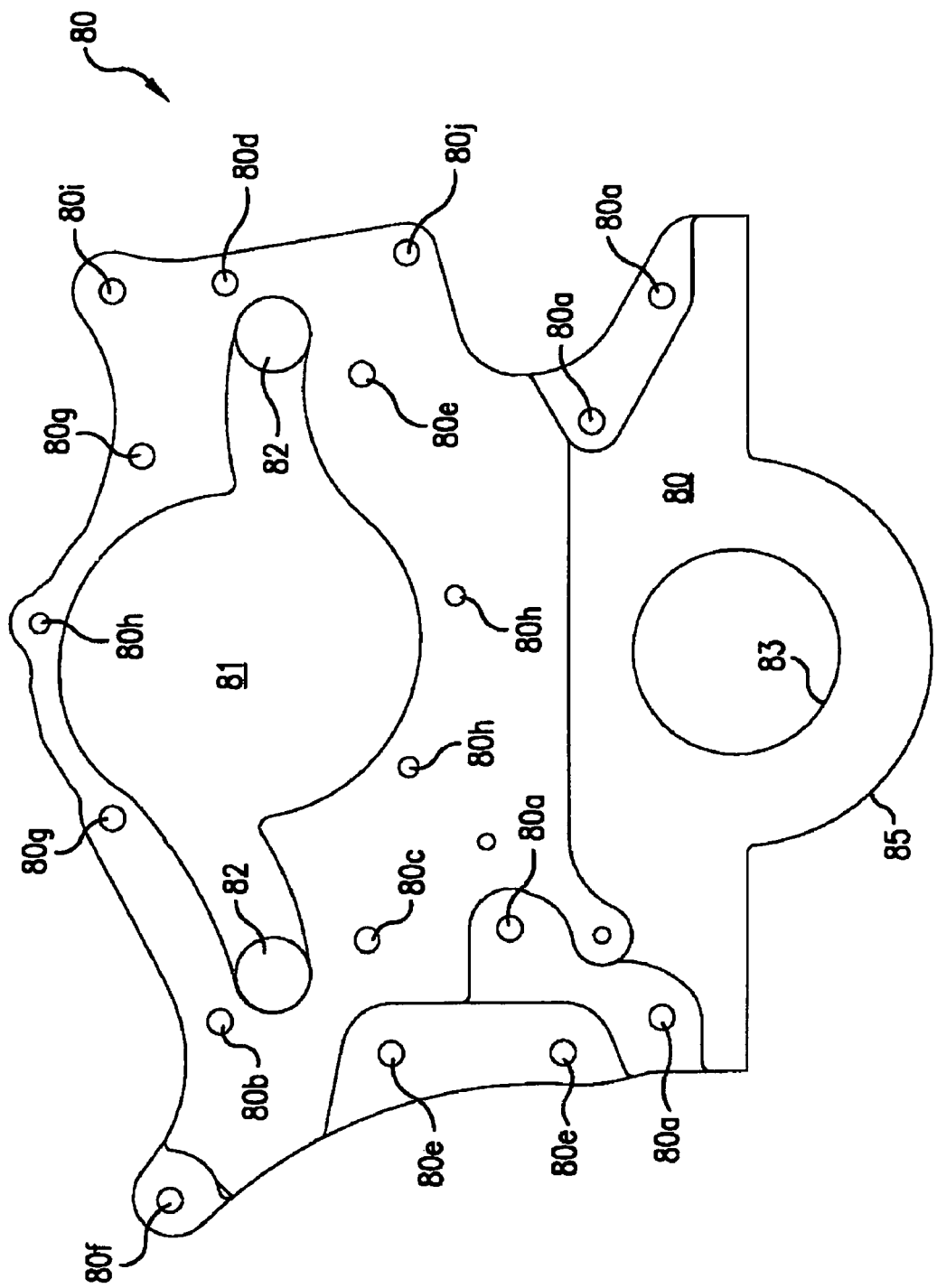
FIG. 28 is a front plan view of the timing chain cover shown in FIG. 27.
Figure 29:
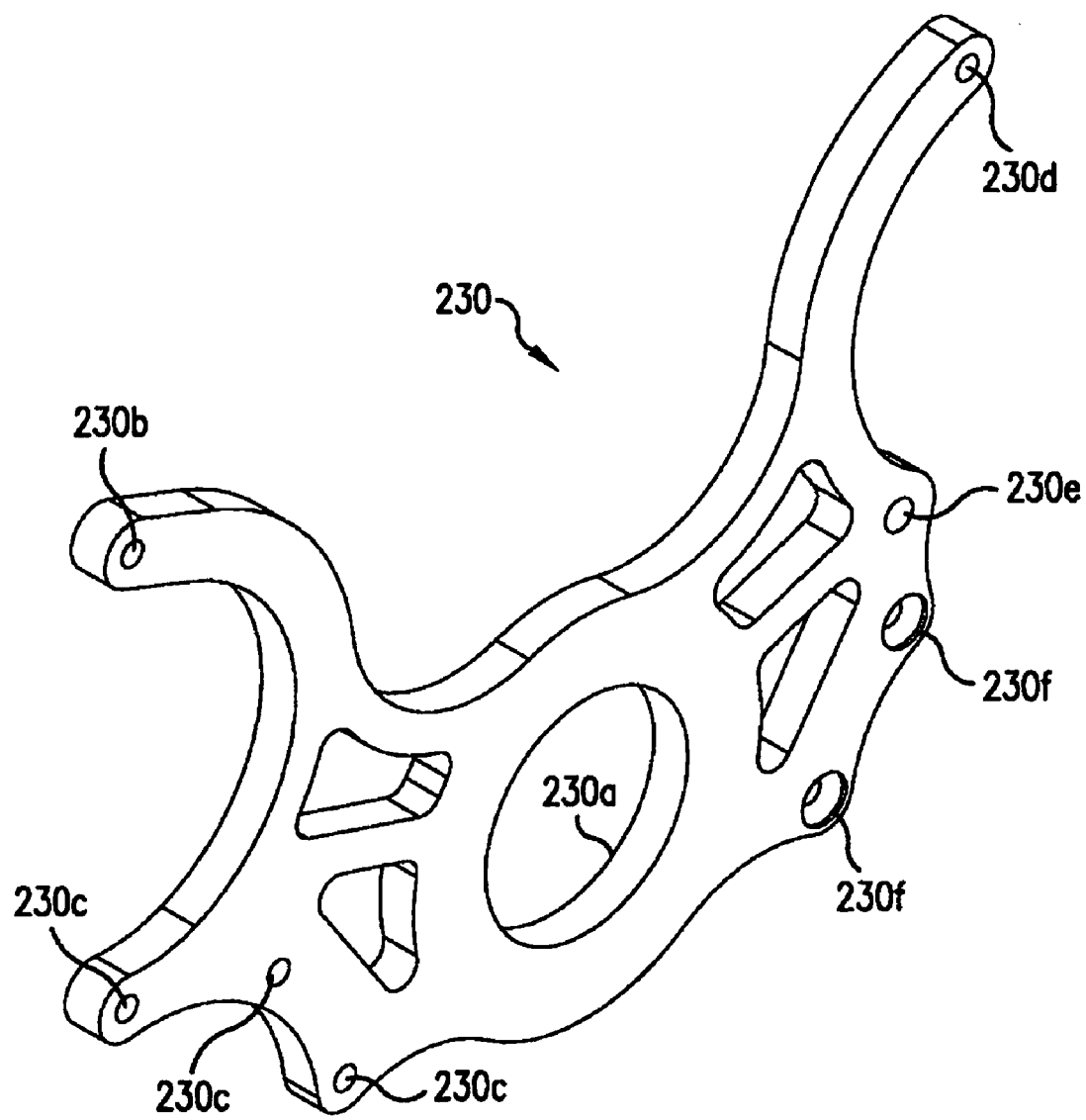
FIG. 29 is a perspective view of a bridge bracket for use in connection with the serpentine belt system shown in FIG. 23.
Figure 30:
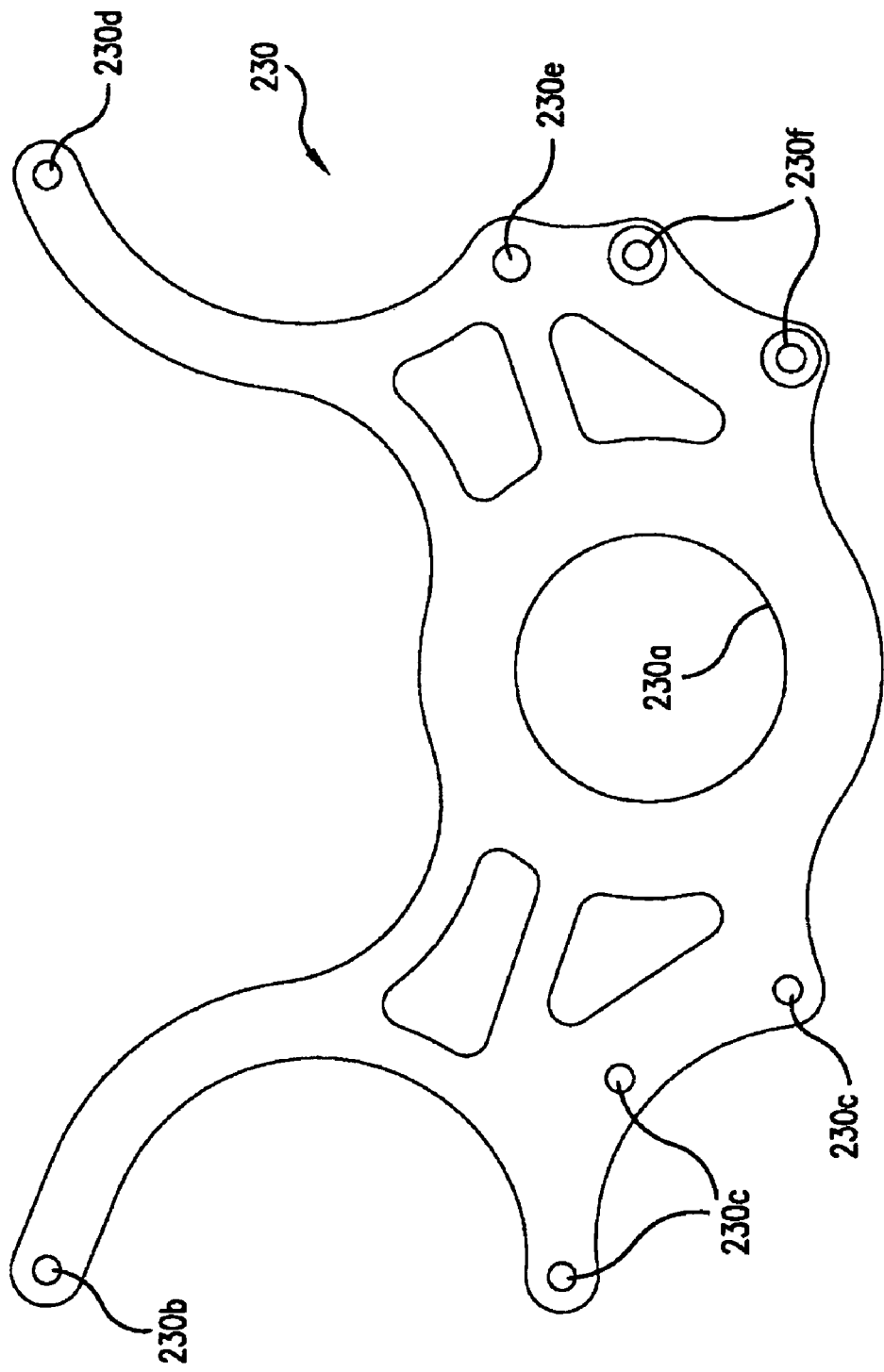
FIG. 30 is a front plan view of the bridge bracket shown in FIG. 29.
Figure 32:
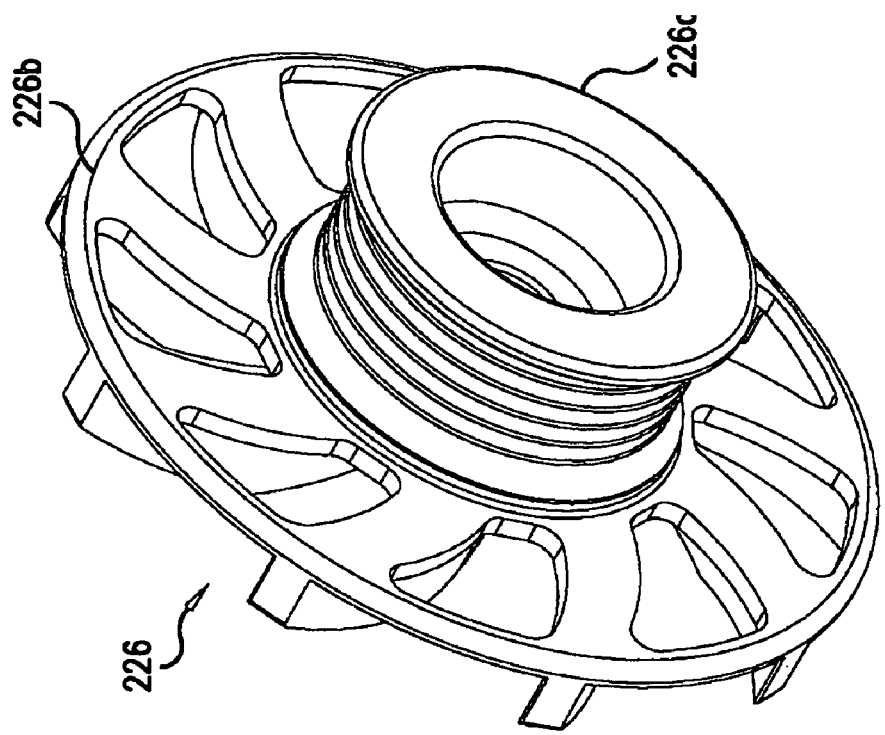
FIG. 32 is a perspective view of an alternator pulley used in the third embodiment of this invention.
Figure 31:
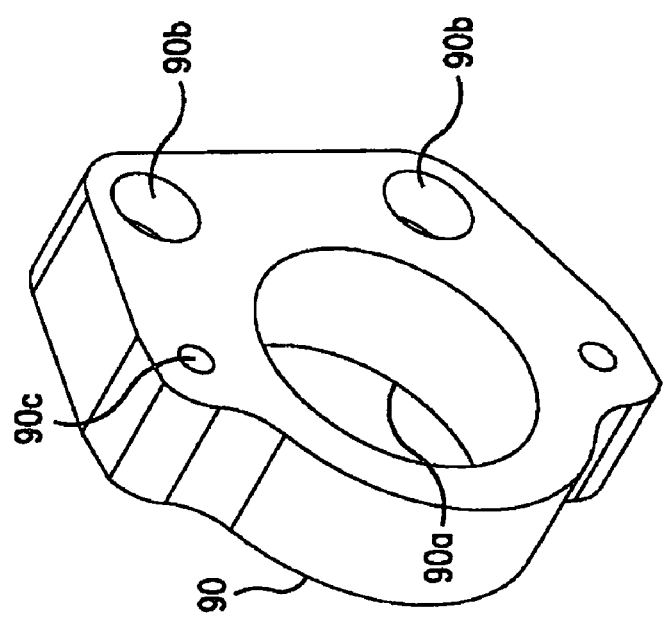
FIG. 31 is a perspective view of a power steering bracket used in connection with the embodiment of this invention shown in FIG. 23.

In the embodiment depicted in, e.g., FIG. 23, alternator 227 is mounted on the upper driver's side of engine and is secured to both bridge bracket 230 and timing cover 80. Alternator boss 227a is secured to bridge bracket 230 by means of a fastener 88 secured into fastener opening 230d. Another alternator boss 227b is secured between bridge bracket opening 230e and timing chain cover opening 80i. A spacer nut (not shown) is preferably mounted between openings 230e and 80i to provide the proper spacing for the assembly. In the depicted embodiment, this alternator spacer nut is 0.875 inches in length, although this could be varied depending on the sizes of the various components. Alternator pulley 226 is shown most clearly in FIG. 32, and comprises a pulley portion 226a on which belt 212 is mounted and a fan portion 226b for cooling of alternator 227.

As previously mentioned, FIGS. 34-47 show a further alternative embodiment of this design and, in particular, for use with a Chrysler Hemi engine or engines having similar characteristics. There is similarity in many of the components with those described previously and many of the details will be obvious to one of skill in the art in light of the prior embodiments. Once again, where similar or identical structure is used, similar numerals will be used with the addition of the prefix "3." As in previous embodiments, the connections of the various components will be obvious to one of skill in the art, and therefore not every fastener, spacer or similar components depicted in the figures will be described herein.

Figure 34:
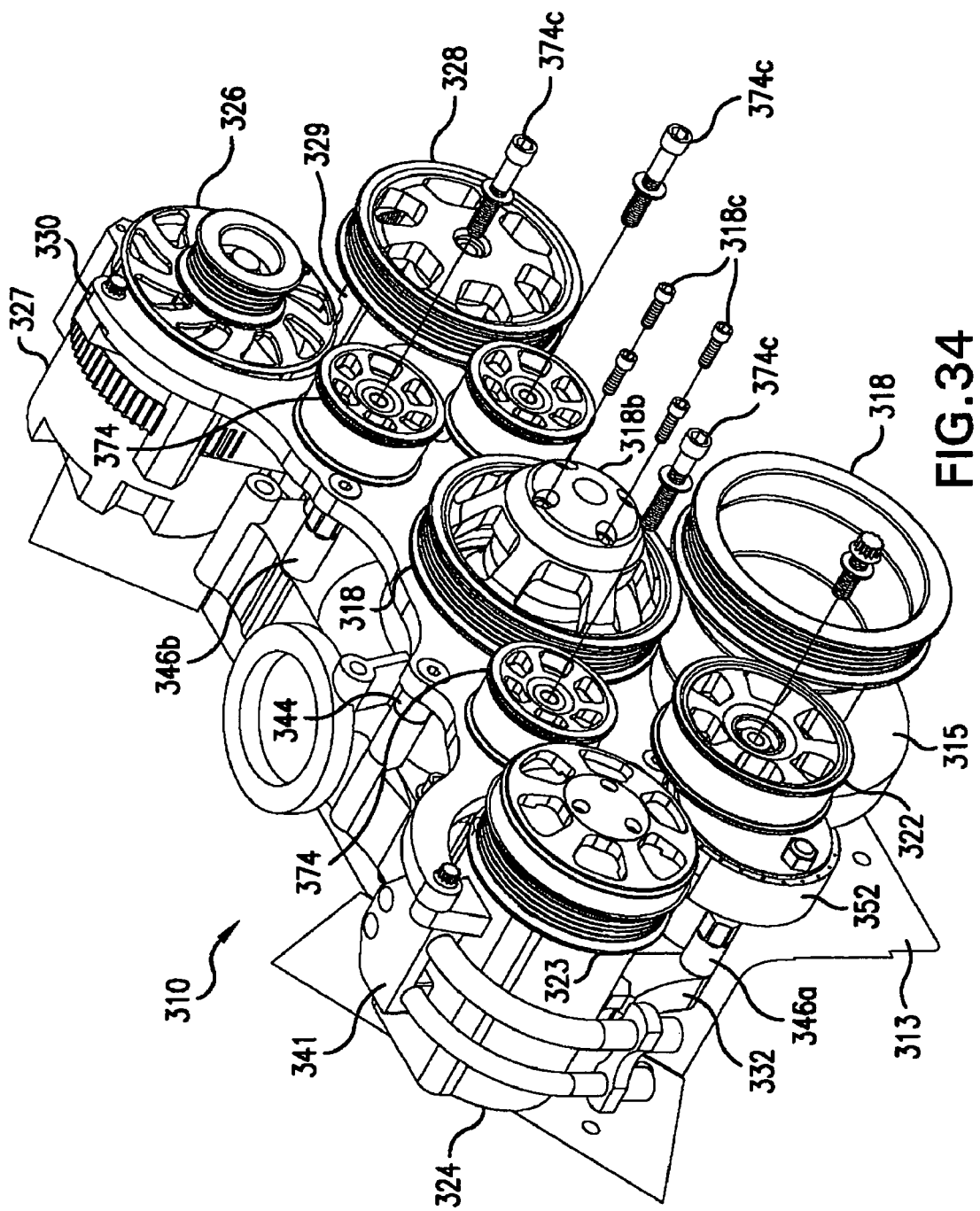
FIG. 34 is a perspective, partially exploded view of an embodiment of a serpentine belt system and associated pumps, compressors, pulleys and related parts, shown in connection with a Chrysler engine.
Figure 35:
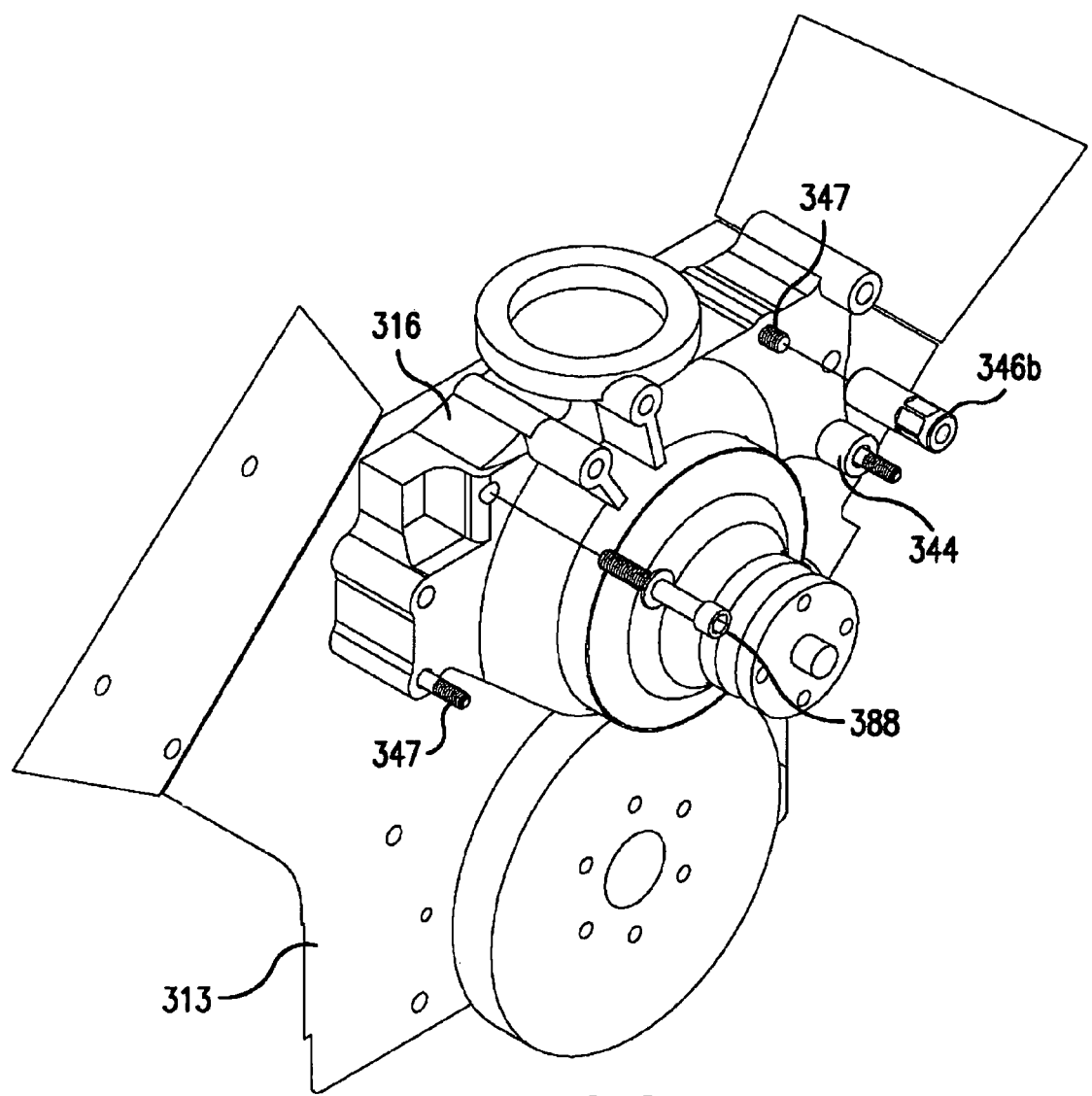
FIG. 35 is a perspective, partially exploded view of a water pump and water pump housing mounted on the front of an engine block.

FIG. 34 shows a partially exploded view of serpentine belt system 310 mounted to an engine block; in this view, only the front face 313 of the engine block and timing chain cover 315 are shown for purposes of clarity. FIG. 34 shows the general arrangement of the components including bridge bracket 330, water pump 316, air conditioning compressor 324, power steering pump 329 and tensioner assembly 320. The belt is not shown in FIG. 34 simply for purposes of clarity and to better show the arrangement of the other elements with respect to one another. In this embodiment, water pump 316 is actually a two-piece unit comprising the water pump and its housing; for simplicity this assembly is referred to as water pump 316.

It will be noted that in this embodiment a series of three idler pulley assemblies 374 are used to provide necessary tension for the belt. One of the idler pulleys 374 is shown in more detail in FIG. 46; each idler pulley 374 includes a cover element 374a and a pulley member 374b joined together. Cover 374a provides a pleasing aesthetic appearance and can be modified without changing the size of the pulley; nose cones are preferably provided on the other pulleys for the same reason. A fastener 374c secures each idler pulley assembly to bridge bracket 330.

FIGS. 34-37 show assembly 310 in various states of assembly in order to demonstrate the relationship between the various parts. Water pump 316 is first mounted on a set of studs 347 of varying length extending from engine block face 313. Additional fasteners are used to properly secure the various components described herein to water pump 316 and/or to other supports or brackets. Water pump pulley 318 is mounted on and drives water pump 316 in a known manner; using a series of fasteners 318c; nose cone 318b is provided to improve the aesthetic appearance of the unit.

Figure 37:
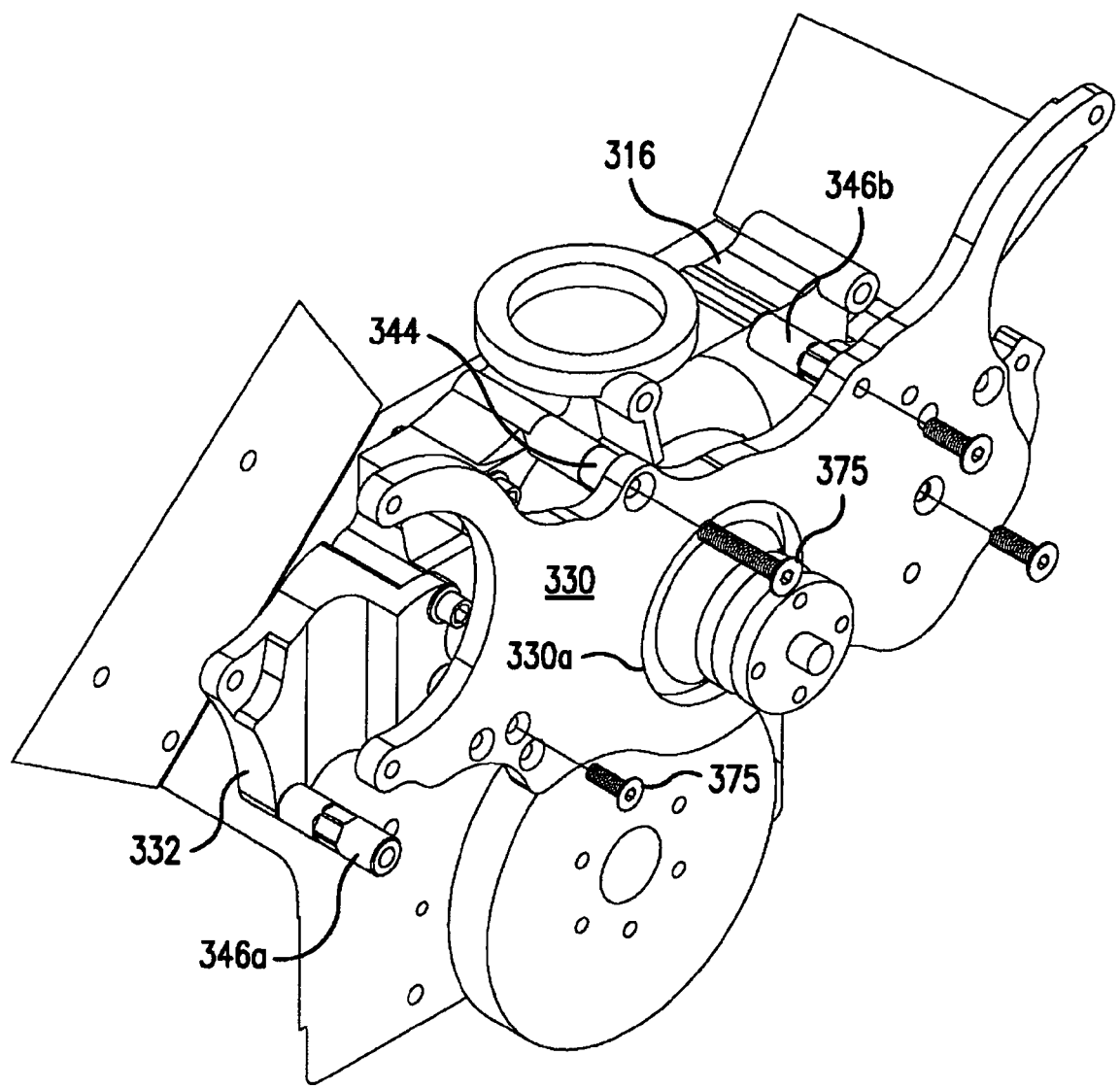
FIG. 37 is a perspective view similar to FIG. 36, with the bridge bracket and other components and spacers attached.
Figure 38:
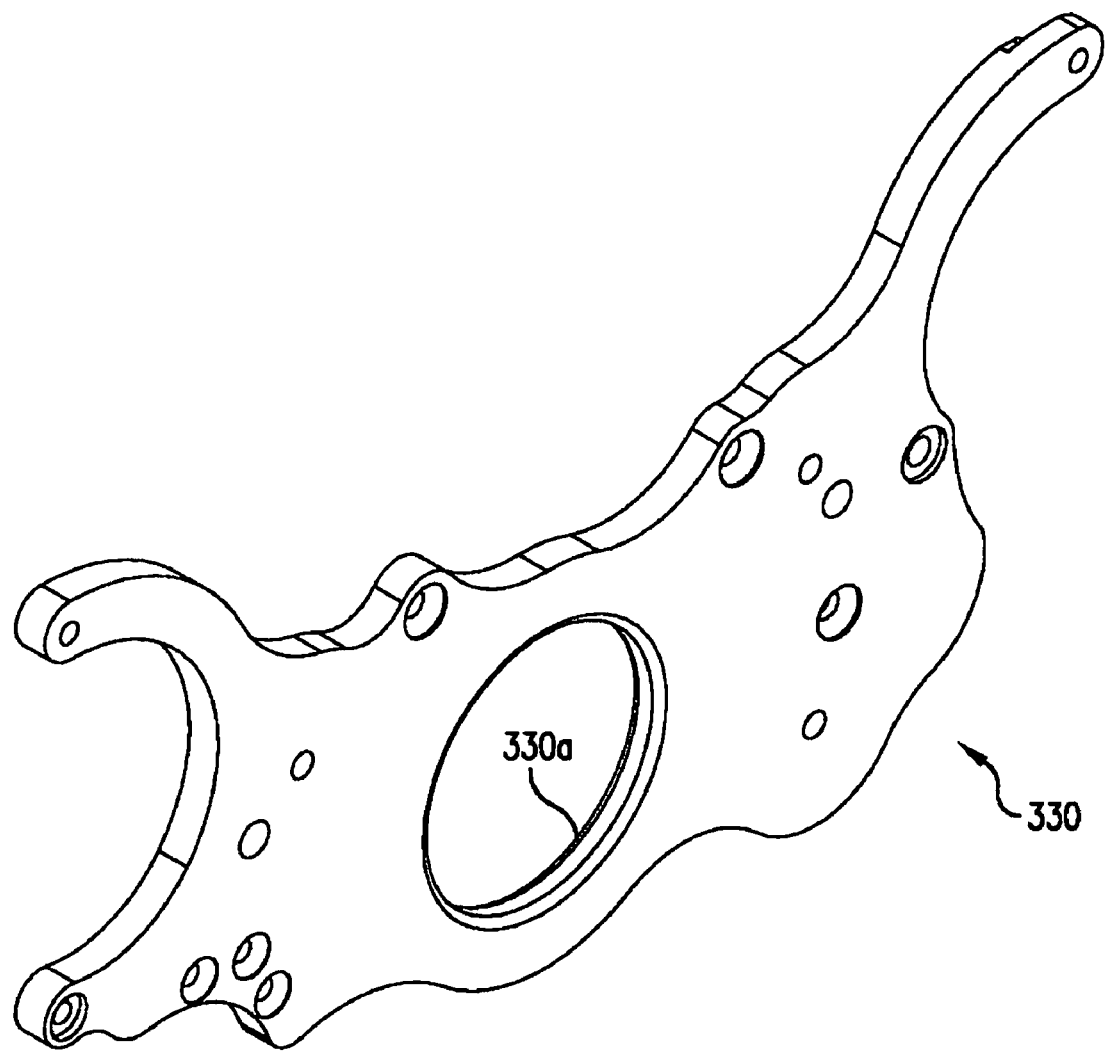
FIG. 38 is a perspective view of a bridge bracket used in the embodiment shown in FIG. 34.
Figure 39:
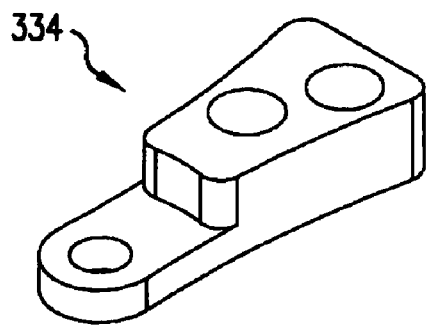
FIG. 39 is a perspective view of the power steering support bracket used in the embodiment shown in FIG. 34.
Figure 40:
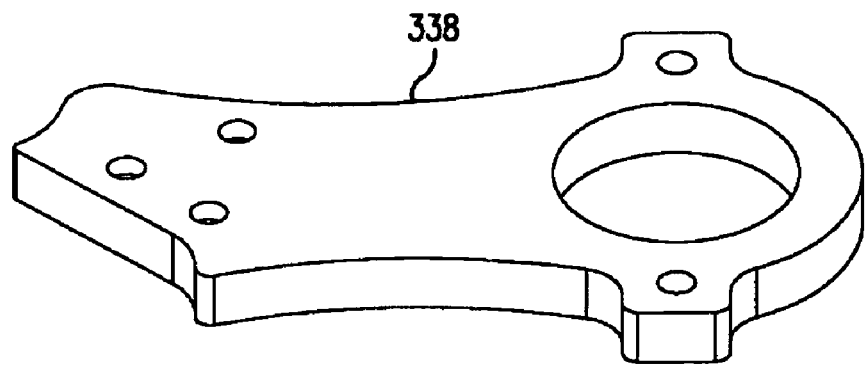
FIG. 40 is a perspective view of the power steering bracket used in the embodiment shown in FIG. 34.

Bridge bracket 330 serves a function similar to that in the previous embodiments; it is shown in detail in FIG. 38 and includes opening 330a to receive a portion of the water, pump 316. FIG. 37 shows bridge bracket 330 secured to water pump 316, and thus indirectly to the face of engine block 313, through various fasteners 375. Spacer nuts 346 and spacers 344 are used as needed to provide the necessary clearance between bridge bracket 330 and water pump 316 and the other components.

Figure 43:
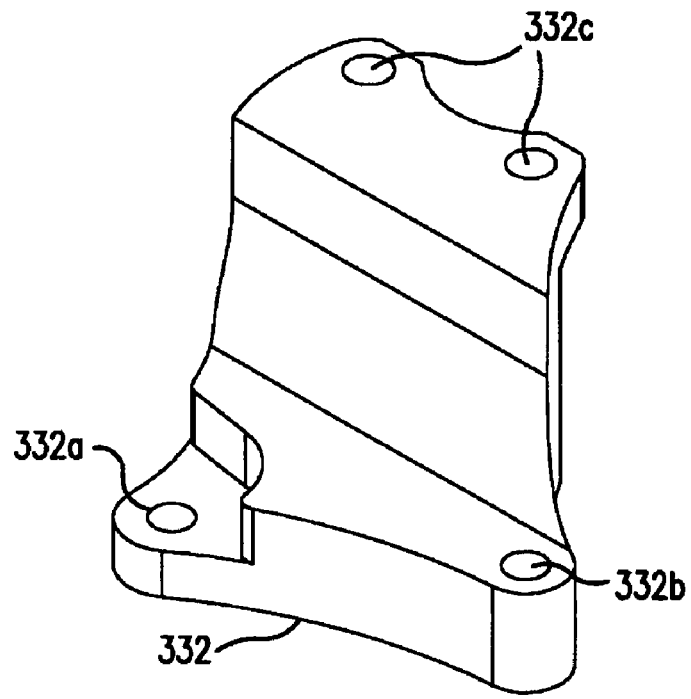
FIG. 43 is a perspective view of an air conditioner bracket used in the embodiment shown in FIG. 34.

Air conditioner bracket 332, shown in detail in FIG. 43, is secured by means of studs 347 and fastener 388 extending into engine block face 313 through fastener openings 332c and water pump 316.

As shown in FIG. 34, air conditioner compressor 324 includes manifold 341 and pulley 323; these elements can be similar to those previously described. Compressor 324 may be secured to air conditioner bracket 332, through fastener opening 332a formed therein. It is also connected to and supported by bridge bracket 330.

Figure 36:
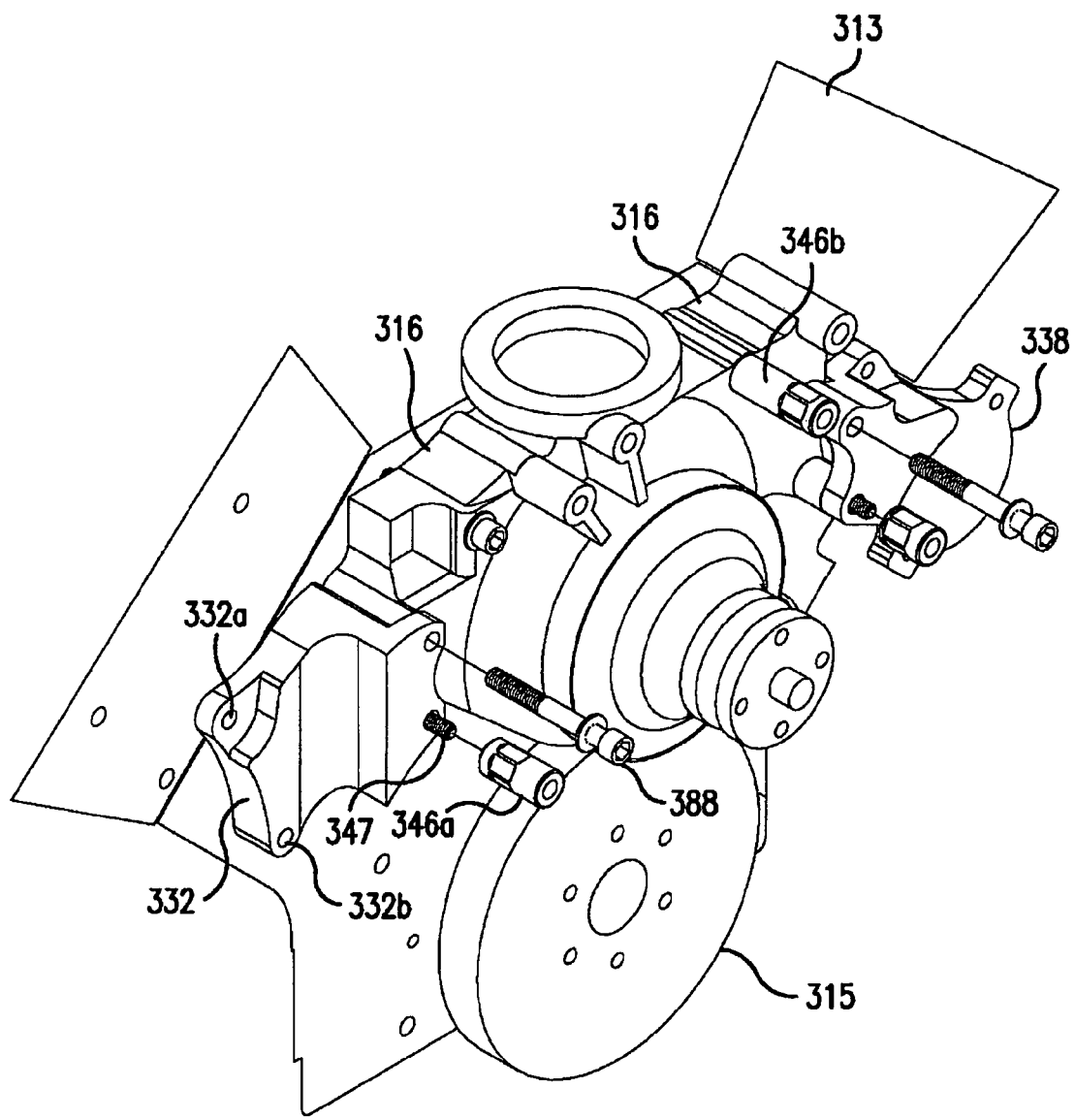
FIG. 36 is a perspective, partially exploded view of a water pump similar to FIG. 35, with various brackets attached.
Figure 41:
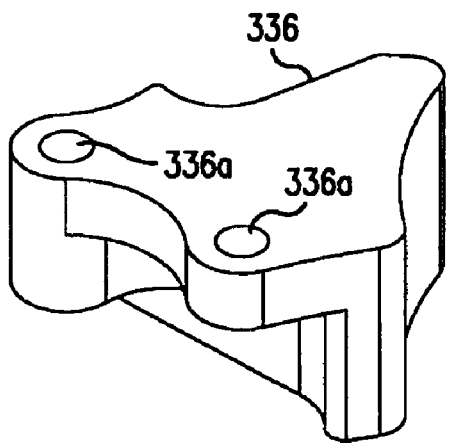
FIG. 41 is a perspective view of the alternator bracket used in the embodiment shown in FIG. 34.
Figure 42:
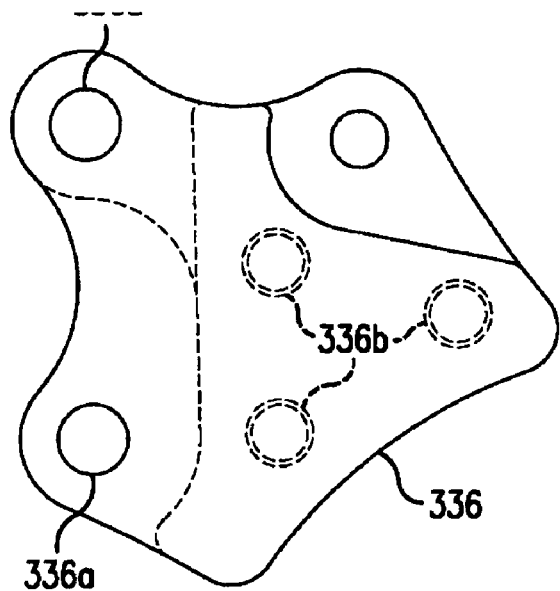
FIG. 42 is a top, plan view of an alternator bracket shown in FIG. 41.

Alternator bracket 336 is secured to water pump 316 by fasteners that extend through fastener openings 336a formed thereon, as depicted in FIGS. 36, 41 and 42. A separate fastener opening 336b is formed on the face of bracket 336 to secure power steering bracket 338 thereto. Alternator 327 has a pulley 326 mounted on the face thereof; this assembly may be substantially identical to that previously described. As shown, alternator 327 is secured to bridge bracket 330 and alternator bracket 336 through various fasteners and spacers or spacer nuts of varying length.

As in prior embodiments, a power steering unit 329 may optionally be included. Pulley 328 is secured to the face thereof to provide a driving force, and unit 329 is secured to the assembly 310 by means of power steering bracket 338 and bracket support 334. Bracket 338 is secured to alternator bracket 336 by various fasteners in a known manner. In this embodiment, bracket support 334 is secured to bridge bracket 330 and to power steering unit 329; if it is desired to eliminate power steering unit 329, then bracket support 334 can be eliminated but bridge bracket 330 does not need to be changed.

Figure 44:
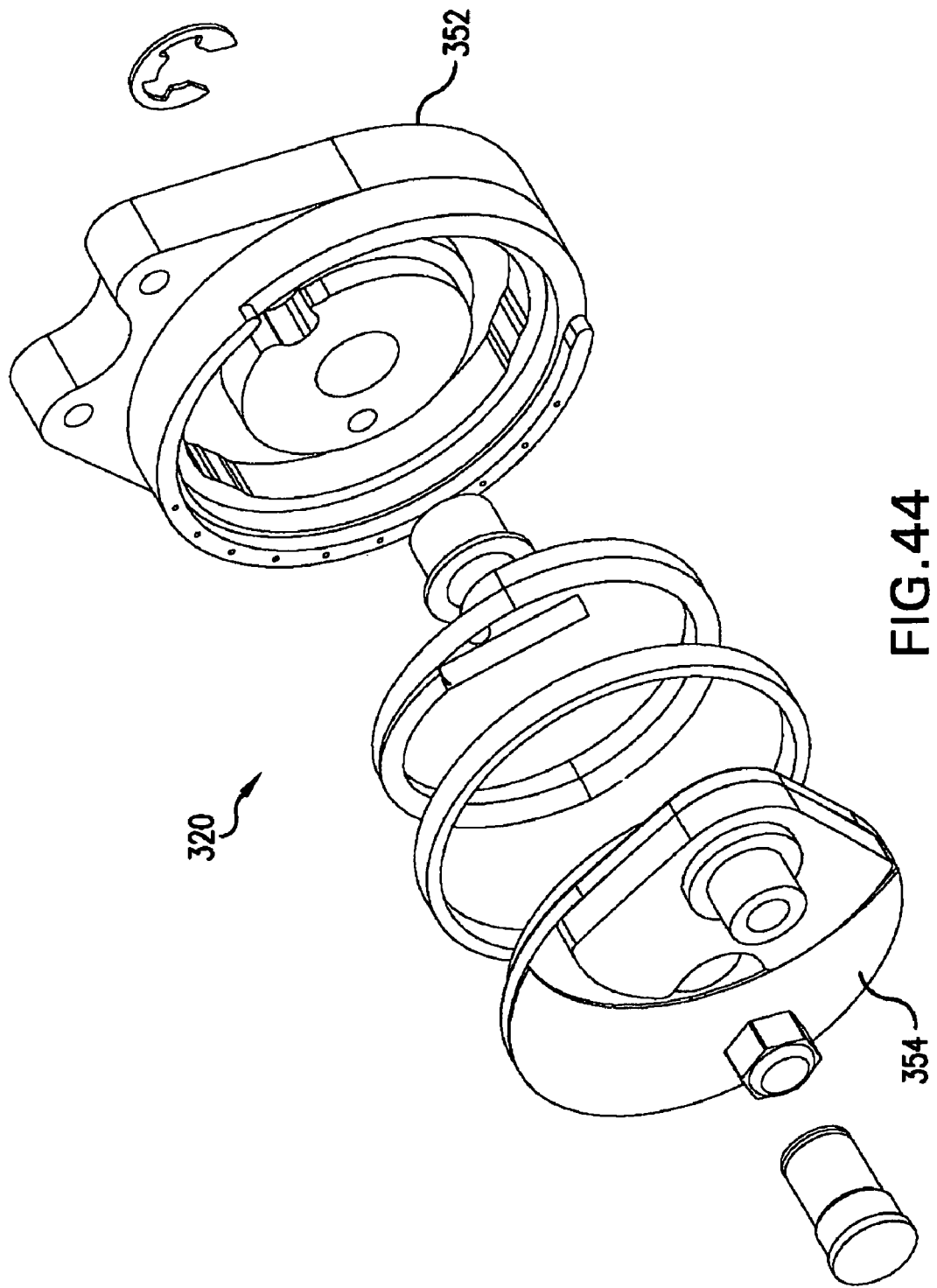
FIG. 44 is an exploded perspective view of the tensioner assembly for the embodiment shown in FIG. 34.
Figure 45:
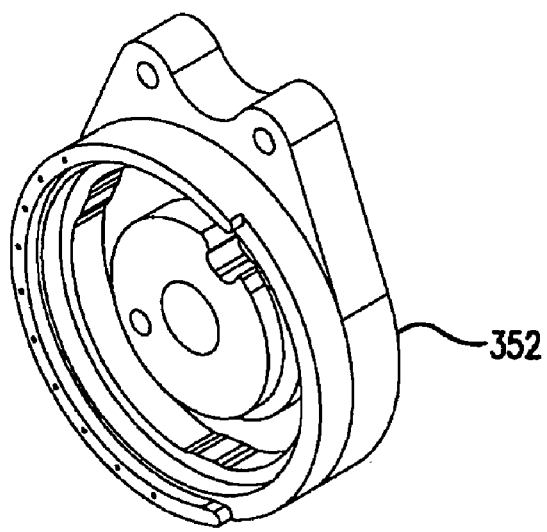
FIG. 45 is a perspective view of the tensioner housing shown in FIG. 48.
Figure 46:
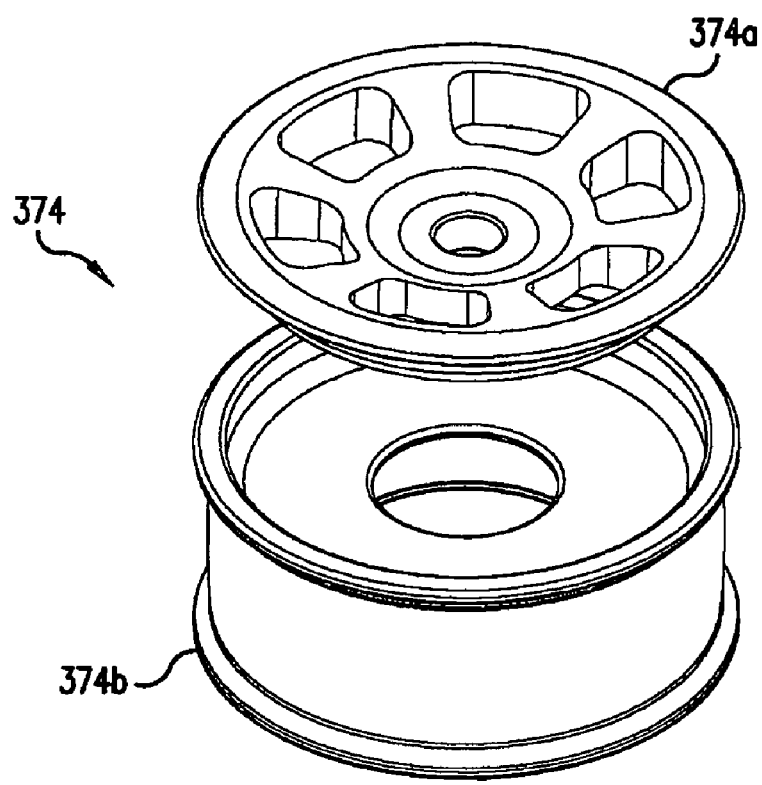
FIG. 46 is an exploded perspective view of an idler pulley and cover assembly for the embodiment shown in FIG. 34.

As shown most clearly in FIGS. 34, 44 and 46, tensioner housing 352 is secured in part to air conditioner bracket 332 through a fastener extending through both fastener opening 332b and a spacer nut 346a and to bridge bracket 330. Tensioner pulley 322 is mounted on tensioner cover 354 in a manner similar to that previously described. As shown in FIG. 44, tensioner assembly 320 is very similar in design and operation to the tensioner assemblies previously described, such as in FIGS. 13 and 22. The shape of housing 352 has been changed to accommodate different contact points in this embodiment.

While specific embodiments of the invention have been described in detail, it will be appreciated by those skilled in the art that various modifications and alternatives to those details could be developed in light of the overall teachings of the disclosure. Accordingly, the particular arrangements of the embodiments disclosed are meant to be illustrative only and not limiting as to the scope of the invention which is to be given the full breadth of the appended claims and any equivalents thereof.

I claim:

1. A serpentine belt system for use in connection with an engine block of an automobile having an air conditioner compressor, a water pump, an alternator and a crankshaft pulley, the belt system comprising:
   a timing cover mounted to the engine block; and
   a bridge bracket mounted to the timing cover in a position offset from and forward of the engine block, the bridge bracket having a first upward extension on a first side for securing the air conditioner compressor and a second upward extension on a second side for securing the alternator.

2. The serpentine belt system of claim 1, wherein the bridge bracket further comprises a central opening through which a portion of the water pump extends.

3. The serpentine belt system of claim 1, wherein the water pump is mounted between the bridge bracket and the timing cover.

4. The serpentine belt system of claim 3, further comprising a plurality of spacer nuts between the bridge bracket and the timing cover for securing the bridge bracket at a position offset from and forward of the timing cover.

5. The serpentine belt system of claim 1, further comprising a, belt for linking the air conditioner compressor, the water pump, and the alternator to the crankshaft pulley.

6. The serpentine belt system of claim 5, wherein the belt does not extend beyond the cross-automobile envelope of the engine block.

7. The serpentine belt system of claim 5, wherein the belt also links the crankshaft pulley to a power steering pump.

8. The serpentine belt system of claim 1, further comprising a plurality of mounting studs that secure the timing cover to the engine block, wherein at least some of the plurality of mounting studs are also used to locate and secure the water pump and a housing for holding a tensioner.

9. The serpentine belt system of claim 8, further comprising at least one mounting stud that extends through the water pump, the timing cover, and the housing for holding the tensioner, and into the engine block.

10. The serpentine belt system of claim 1, wherein at least one of the air conditioner compressor and the alternator are also secured directly to the timing cover.

11. A serpentine belt system for use in connection with an engine block of an automobile having a water pump, an alternator and a crankshaft pulley, the belt system comprising:
   a timing cover mounted to the engine block;
   a bridge bracket mounted to the timing cover in a position offset from and forward of the engine block, the bridge bracket having a central opening through which a portion of the water pump is disposed; and a belt for linking the water pump and the alternator to the crankshaft pulley.

12. The serpentine belt system of claim 11, wherein the bridge bracket further comprises an upward extension for securing the alternator.

13. The serpentine belt system of claim 12, wherein the alternator is also secured directly to the timing cover.

14. The serpentine belt system of claim 11, wherein the water pump is mounted between the bridge bracket and the timing cover.

15. The serpentine belt system of claim 14, further comprising a plurality of spacer nuts between the bridge bracket and the timing cover for securing the bridge bracket at a position offset from and forward of the timing cover.

16. The serpentine belt system of claim 11, wherein the belt does not extend beyond the cross-automobile envelope of the engine block.

17. The serpentine belt system of claim 11, wherein the belt also links the crankshaft pulley to a power steering pump.

18. The serpentine belt system of claim 11, further comprising a plurality of mounting studs that secure the timing cover to the engine block, wherein at least some of the plurality of mounting studs are also used to locate and secure the water pump and a housing for holding a tensioner.

19. The serpentine belt system of claim 18, further comprising at least one mounting stud that extends through the water pump, the timing cover, and the housing for holding the tensioner, and into the engine block.

20. A serpentine belt system for use in connection with an engine block of an automobile having an air conditioner compressor, a water pump, an alternator and a crankshaft pulley, the belt system comprising:
 a timing cover mounted to the engine block; and
 a bridge bracket mounted to the timing cover in a position offset from and forward of the engine block, the bridge bracket engaged to and securing at least the air conditioner compressor and the alternator; and
 a belt for linking the air conditioner compressor, the water pump, and the alternator to the crankshaft pulley, wherein the belt does not extend beyond the cross-automobile envelope of the engine block.

21. A serpentine belt system for use in connection with an engine block for an automotive engine having an air conditioner compressor, a water pump, an alternator and a crankshaft pulley, the belt system comprising:
 a timing cover having a first timing cover surface abutting the engine block, and a second timing cover surface facing away from the engine block and abutting a first surface of the water pump; and
 a bridge bracket having a first bridge bracket surface facing the engine block and abutting a second surface of the water pump, and a second bridge bracket surface facing away from the engine block.

22. The serpentine belt system of claim 21, wherein the water pump further comprises an extension that extends through a central opening in the bridge bracket and beyond the second bridge bracket surface.

\* \* \* \* \*